(12) United States Patent
Erisman

(10) Patent No.: US 7,853,500 B2
(45) Date of Patent: Dec. 14, 2010

(54) SYSTEM AND METHOD FOR DETERMINING RIGHT OF ACCESS

(75) Inventor: Terry Erisman, Menlo Park, CA (US)

(73) Assignee: John Nicholas and Kristin Gross Trust U/A/D April 13, 2010, Berkeley, CA (US)

(*) Notice: Subject to any disclaimer, the term of this patent is extended or adjusted under 35 U.S.C. 154(b) by 341 days.

(21) Appl. No.: 11/776,420

(22) Filed: Jul. 11, 2007

(65) Prior Publication Data

US 2008/0015973 A1     Jan. 17, 2008

Related U.S. Application Data

(62) Division of application No. 09/560,203, filed on Apr. 28, 2000.

(51) Int. Cl.
*G06Q 40/00* (2006.01)
(52) U.S. Cl. .............................. 705/35; 705/36; 705/37; 705/39; 705/42
(58) Field of Classification Search ............... 705/1–80; 707/1–6, 10
See application file for complete search history.

(56) References Cited

U.S. PATENT DOCUMENTS

| | | | |
|---|---|---|---|
| 4,334,270 A | 6/1982 | Towers | |
| 4,674,044 A | 6/1987 | Kalmus et al. | |
| 4,903,201 A | 2/1990 | Wagner | |
| 5,077,665 A | 12/1991 | Silverman et al. | |
| 5,136,501 A | 8/1992 | Silverman et al. | |
| 5,239,480 A * | 8/1993 | Huegel ........................ | 705/5 |
| 5,557,517 A | 9/1996 | Daughterty | |
| 5,664,115 A | 9/1997 | Fraser | |
| 5,689,652 A | 11/1997 | Lupien et al. | |
| 5,724,524 A | 3/1998 | Hunt et al. | |
| 5,794,207 A * | 8/1998 | Walker et al. ................. | 705/1 |
| 5,835,896 A * | 11/1998 | Fisher et al. .................. | 705/37 |

(Continued)

FOREIGN PATENT DOCUMENTS

WO     0057333 A2     9/2000

(Continued)

OTHER PUBLICATIONS

"Negotiating Beyond the Bid Price", Joan Morris, Pattie Maes, MIT Media Lab, 1998.*

(Continued)

*Primary Examiner*—Ella Colbert
*Assistant Examiner*—Hai Tran
(74) *Attorney, Agent, or Firm*—J. Nicholas Gross, Atty

(57) ABSTRACT

Various methods and systems for auctioning items such as golf tee times, restaurant reservations, concert tickets or hotel reservations are disclosed. Users can effectively bid on a large number of items but receive at most one item at the end of the auction. This method has the favorable effects for the users of: (1) increasing the probability of successfully bidding for at least one item; (2) making the auction process more convenient by greatly reducing the need for actively monitoring the auction; and, (3) decreasing the possibility a user will be out bid at the last moment and receive no item. This method has the favorable effects for the seller of increasing the probability their listed items will sell and increasing the expected average sales price.

21 Claims, 9 Drawing Sheets

U.S. PATENT DOCUMENTS

| | | | |
|---|---|---|---|
| 5,845,266 A | 12/1998 | Lupien et al. | |
| 5,924,082 A | 7/1999 | Silverman et al. | |
| 6,012,045 A | 1/2000 | Barzilai et al. | |
| 6,012,046 A | 1/2000 | Lupien et al. | |
| 6,021,398 A | 2/2000 | Ausubel | |
| 6,041,308 A | 3/2000 | Walker et al. | |
| 6,044,363 A | 3/2000 | Mori et al. | |
| 6,085,176 A | 7/2000 | Woolston | |
| 6,101,484 A | 8/2000 | Halbert | |
| 6,151,589 A | 11/2000 | Aggarwal et al. | |
| 6,216,114 B1 * | 4/2001 | Alaia et al. | 705/37 |
| 6,243,691 B1 | 6/2001 | Fisher et al. | |
| 6,266,652 B1 | 7/2001 | Godin et al. | |
| 6,269,361 B1 | 7/2001 | Davis et al. | |
| 6,321,212 B1 | 11/2001 | Lange | |
| 6,415,270 B1 | 7/2002 | Rackson et al. | |
| 6,606,607 B1 | 8/2003 | Martin et al. | |
| 6,907,405 B2 * | 6/2005 | Brett | 705/37 |
| 7,181,405 B1 | 2/2007 | Sako | |
| 7,225,151 B1 * | 5/2007 | Konia | 705/37 |
| 7,330,826 B1 | 2/2008 | Porat et al. | |
| 2002/0013757 A1 | 1/2002 | Bykowski et al. | |

FOREIGN PATENT DOCUMENTS

| | | |
|---|---|---|
| WO | WO0057323 | 9/2000 |
| WO | WO0063808 | 10/2000 |
| WO | WO0129750 | 4/2001 |

OTHER PUBLICATIONS

Press Release, "Book4golf.com to Become Exclusive Internet Tee-Time Provider to Crescent Systems," Feb. 2, 2000, 1 page.

Ausubel, Lawrence; U.S. Appl. No. 60/134,666, filed May 18, 1999, 15 pages.

Doyle, John M.; "NYSE seeks OK for after-hours trading," Chicago Sun-Times, May 20, 1991, 4 pages.

Copeland, Henry; "TeleKom Group in $875 Million Deal in Hungary," New York Times, Dec. 20, 1993, 3 pages.

"Beverly Hills Country Club and MindSpring Announce an Agreement to Launch Internet Web Site for Charity Auctions." PR Newswire, PR Newswire Association LLC, Jun. 23, 1998, 4 pages.

* cited by examiner

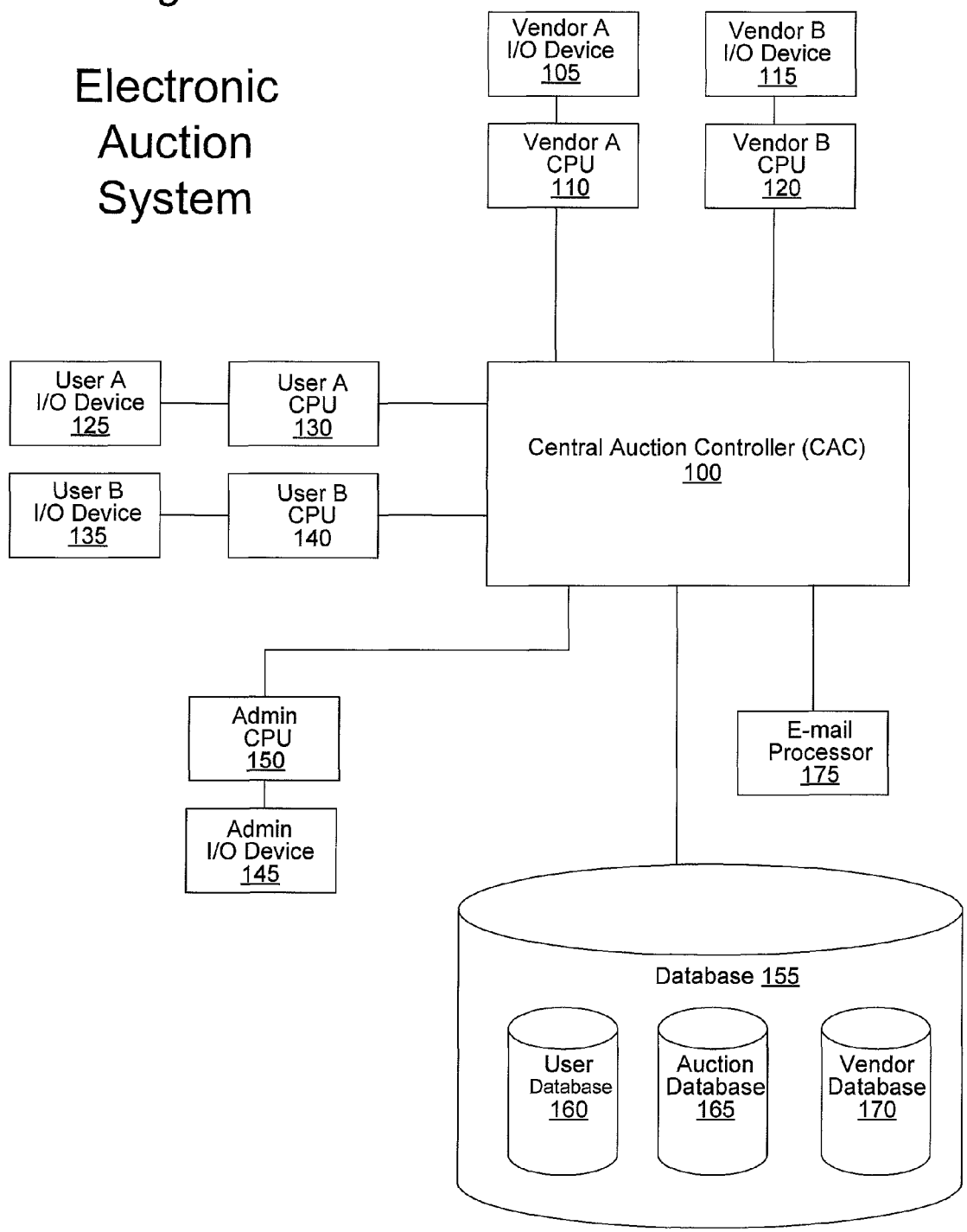

Figure 1A

Auction Item 178

| ID 180 | Item Description 181 | Location 182 | Tee Time 183 | Duration 184 | Quantity 185 | Auction Expiration Date 186 | Reserve or Minimum Price 187a | Guaranteed Price 187b | User Bid Price 188 | Ranking 189 | Optional Information 190 |
|---|---|---|---|---|---|---|---|---|---|---|---|
| Item 1 | Golf Reservation | The Willows Golf Course | 8:30 | 4:00 hours | 4 | 4/5/00 | $100 | $150 | $125 | 2 | Autobid Activated |

Figure 1B

Auction Bids 179

| User ID 188a | User Bid Price 188b | Ranking 189 | Optional Information 190 |
|---|---|---|---|
| Item 1 | $125 | 2 | Autobid activated |

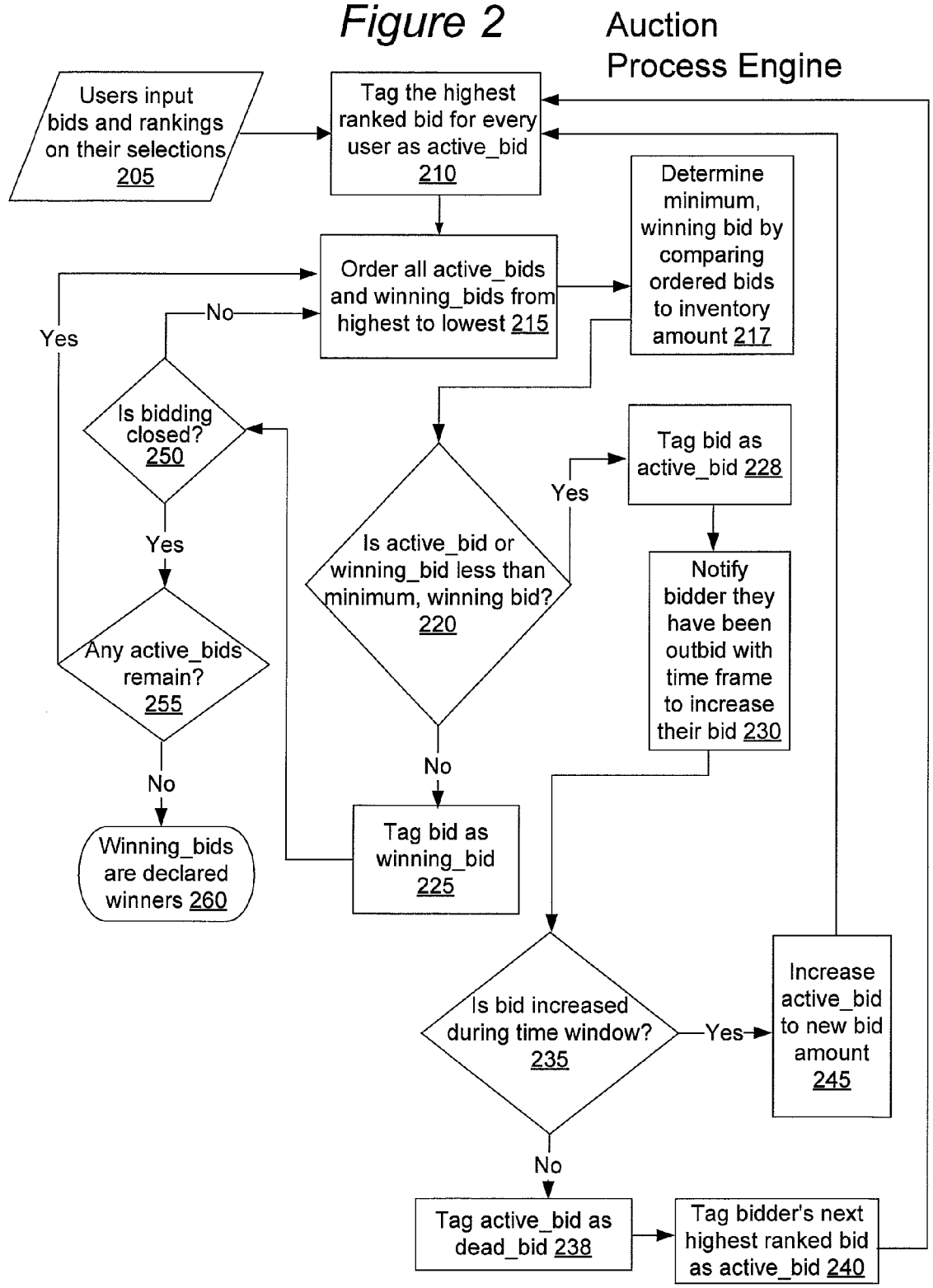

Figure 3

User Auction Item Bid Table

| Item Number 310 | Bid Amount 315 | Rank Order 320 |
|---|---|---|
| 1 | $10 | Second |
| 2 | $11 | Fifth |
| 3 | $8 | First |
| 4 | $12 | Third |
| 5 | $16 | Fourth |

Figure 4

Cross Reference Auction Item Table 400

| | Item 1  405 | Item 2 | Item 3 |
|---|---|---|---|
| User 1 | $10, First  415 | $10, Second | $10, Third |
| User 2  410 | $11, Second | $12, Third | $12, First |
| User 3 | $9, First | $11, Third | $13, Second |

Figure 5

Auction Outcome Table 500

| | Item 1  505 | Item 2 | Item 3 |
|---|---|---|---|
| User 1 | $10, First  515 | $10, Second  520 | $10, Third  525 |
| User 2  510 | $11, Second  530 | $12, Third  535 | $12, First  540 |
| User 3 | $9, First  545 | $11, Third  550 | $13, Second  560 |

Figure 9

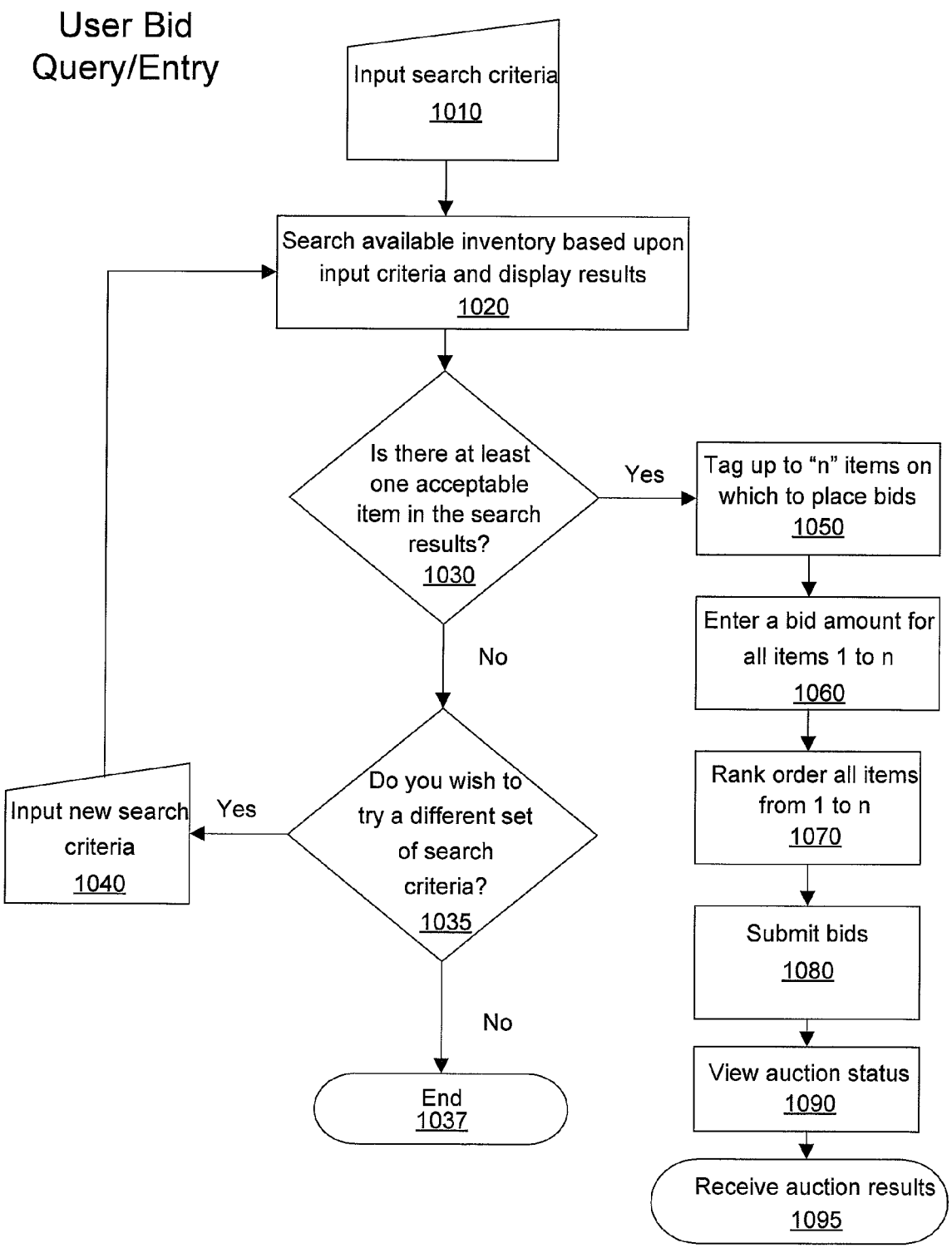

SYSTEM AND METHOD FOR DETERMINING RIGHT OF ACCESS

CROSS REFERENCE TO RELATED APPLICATIONS

The present application claims priority to and is a divisional of Ser. No. 09/560,203, which is hereby incorporated by reference.

FIELD OF THE INVENTION

The present invention is directed to systems and methods for performing automated auctions, and specifically those auctions involving bidding on items that are somewhat mutually exclusive, and/or those types of auctions which are resolved on a collective basis with reference to more than one demand constraint provided in a bid.

BACKGROUND OF THE INVENTION

The practice of online auctions has grown at a dramatic pace. Auction sites have been developed for a wide range of products. This has resulted in an active, dynamic pricing environment for many products. The standard auction practice may result in the maximization of the seller's revenue in some instances. Additional information on electronic auction and bidding systems can be found in such U.S. Pat. Nos. 6,041,308, 6,021,398, 6,012,046, 6,012,045, 5,924,082, 5,835,896, 5,845,266 and 5,689,652, which are hereby incorporated by reference herein. Commercial examples of auctions systems are also accessible online on the Internet, at websites managed by such companies as E-Bay, Yahoo, and other similar sites.

However, the standard auction practice is limited in some respects. A user may not be able to utilize two mutually exclusive items. For example, one person cannot physically use two golf tee times at the same time, on the same date at two different golf courses. Or, a user may not want to take possession of more than one out of a collection of items. For example, a user may only wish to accept one golf tee time on either Saturday or Sunday, but not a time on both Saturday and Sunday. Therefore, users can bid on only one mutually exclusive item at a time. If they are the high bidder on more than one item, they may dispose of the other item through resale or allowing it to expire in the case of time-based items. At the same time, a user bidding on only one mutually exclusive item decreases the probability they will be successful. If they bid on more than one item, they increase the probability they will be successful bidding on any one of the items. However, they risk being the winning bidder on more than one item.

From the seller's perspective, if bidders only place bids on one mutually exclusive item at a time, the number of bids on any one item will be less than if they placed bids on multiple items simultaneously which lowers the expected winning bid. Also, if bidders limit themselves to a single bid, the probability no one will place a bid on any individual item increases, thus lowering the probability the seller will successfully sell their item.

Furthermore, the standard auction method does not allow the simultaneous maximization of two constraints. For example, a bidder may have a range of preferences and maximum prices they are willing to pay for a set of items. However, standard auction practices do not allow the simultaneous maximization of both user preference and bid prices. They only maximize based upon bid price. While U.S. Pat. No. 5,924,082 referenced above includes an option for providing ranking information, this option does not allow a bidder to prioritize bids in such system. Moreover, the system described therein does not actually consummate a bid for an item, but rather merely identifies potential acceptable transactions between two parties.

Finally, while there is some prior art capability to perform bidding on multiple items of the same kind (in so-called Dutch auctions), the bidding process there is not optimized from the perspective of the seller, since the lowest winning bid price for the item is awarded to all the other winning bids, even if such latter bids are much higher. In other words, if 100 persons bid on 5 identical widgets, the five winning bidders all pay the same price, equal to the $5^{th}$ highest bid, and this result can distort the bidding process.

SUMMARY OF THE INVENTION

An object of the present invention, therefore, is to eliminate the problems generally inherent in the aforementioned prior art systems.

Another object of the invention is to provide a system and method for flexibly auctioning mutually exclusive items.

It is another object of the invention to allow users to enter bids and a rank order for mutually exclusive items to maximize the users' preference while simultaneously maximizing the bid amount, thus utilizing more than one constraint when conducting an electronic auction.

A further object of the invention is to provide a system and method for allowing a user to enter bids on multiple, mutually exclusive items but only receive the item corresponding to their highest ranked, winning bid.

Yet another object of the invention is to provide a system and method for allowing a seller of a particular item to maximize both the number and quality of bids made in an auction for such item by increasing the probability that an item will receive a bid;

Still another object of the present invention is to provide a mechanism by which a number of similarly related items can be aggregated and auctioned simultaneously to a number of separate purchasers, such as for example, a group of tee times at a particular golf course that are allocated on a daily basis to a group of competing golf players (or alternatively, a group of travel seats, a group of restaurant seats, concert seats, hotel rooms, automobiles, etc.);

A related object of the present invention is to further organize and combine successful bidders at the end of the auction so that their enjoyment of the item is further optimized, such as, for example, in the case of a group of persons successfully bidding for a golf tee time, where such persons can be allocated a priority of play within such tee time that ensures maximum playability according to some additional characteristic, such as their skill level;

Still another object of the present invention is to allow a user to minimize their required involvement in the auction process by enabling them to enter multiple bids on multiple items without worry that they will receive more than one item. This can be true when all items are included in an auction ending at the same time or when items are in a series of auctions that close on successive dates.

Still further objects and advantages will become apparent from a consideration of the ensuing description and accompanying drawings. These advantages and many more are realized by the many aspects and features of the present inventions, which include:

A first aspect of the present invention, including a system and method for allowing a bidder to enter bid information for an electronic auction, which incorporates the steps of: reviewing a database of items available for auction; entering a set of bids for a corresponding set of items selected from the database, each bid in the set of bids including at least a bid price and a bid ranking for an item. In this manner, the bidder can specify a bid ranking for an item represents a desired order in which a bid is to be resolved in the electronic auction.

In a variation of this aspect of the invention, a set of bids from any particular bidder each includes a unique bid ranking for each of the corresponding set of items. Furthermore, the bidder can also provide a maximum bid price for each bid, and an auto-bid indicator for raising the bid price as needed until the maximum bid price is reached. The bidder can also monitor a status of the electronic auction, including a high bid for an item, and information relating to other conditional bids for the item, such as a number of conditional bids that equal or exceed the highest unconditional bid. This information helps to stimulate the bidding process, and to enhance the number of bids made by participants.

A further variation of this embodiment presents an option to the bidder so that they can opt out of the auction process if desired by selecting a guaranteed purchase option for an item, which is typically higher than a highest bid price, but avoids further delay and involvement for the bidder.

Another aspect of the present invention concerns a system and method for monitoring bid information for an electronic auction. This includes the following operations: retrieving a set of items from an auction database in accordance with a specified search criteria; displaying the set of items; and for each item in the set of items, displaying a current highest unconditional bid price and information relating to any conditional bids for the item. Again, the display of conditional bid information acts as a facilitator for motivating submission of additional bids by potential purchasers.

In a variation of this aspect of the invention, the set of items displayed correspond to inventory to be auctioned during a common auction period. Furthermore, the information relating to the conditional bids includes a numerical value indicating a number of the conditional bids having a bid price equal to or exceeding the highest unconditional bid price and/or a minimum bid price for the item.

Again in a more specific variant of this aspect of the invention, the auction items correspond to access rights to an entertainment facility, such as a golf course, where the bidders are bidding to perform an activity (such as playing golf) at a desired golf tee time such course. Other access rights are also auctionable, of course, for enjoying activities at movie, concert, restaurants, theme parks, travel and other venues to name a few.

Another aspect of the present invention relates to a system and method of participating in an electronic auction which is based on at least two constraints, namely a bid price and a bid rank. This generally comprises the following steps by the bidding participants: reviewing a database of items available for auction; entering a set of bids for a corresponding set of items selected from the database, each bid in the set of bids including at least a bid price and a bid ranking for an item; and processing the set of bids based on both the bid price and the bid ranking for the corresponding set of items to determine if there is at least one winning bid for one of the corresponding set of items.

Again, in a variation on this aspect of the present invention, the auction items are aggregated and considered en masse for a particular auction based on a common predefined auction period. The processing step determines how the corresponding set of items should be auctioned based on first considering a highest ranking bid submitted. During the bid submission process, each user submits a set of bids that includes at least one unconditional bid for a highest ranked item taken from the corresponding set of items, and the remainder of the set of bids are comprised of conditional bids for items ranked below the highest ranked item. The conditional bids are not considered unless the bidder's unconditional bid is unsuccessful for the highest ranked item.

Further in a variant of this aspect of the invention, an additional notification step is performed to notify a bidder when a highest ranked bid is unsuccessful for a corresponding item. This allows the bidder to increase a bid price for the highest ranked bid and thus re-enter the auction process if desired. If the bidder does not change his/her bid, the highest ranked bid is declared inactive, and the next highest bid is now considered. If however, one bid from the set of bids is satisfied for a bidder, any remaining bids are not evaluated for the bidder. In this way, the bidder can be guaranteed never to have to take possession of more than one item, even across multiple item biddings, and multiple auctions. The system also accommodates multiple sets of bids entered by multiple participants in the auction. The multiple sets of bids are subjected to the auction processing to determine a single winning bid for each of the corresponding set of items.

Yet another aspect of the present invention covers a system and method for participating in an electronic auction that considers both conditional and unconditional bids. This system and method uses the following operational steps: selecting a set of N items from a database of items available for auction, the set of N items being characterized by a common auction expiration period; entering a set of N bids for the set of N items, such that the set of N bids includes at least one unconditional bid for one item in the set of N items, and the remainder of the set of N bids being comprised of conditional bids for a remainder of the N items; processing the set of bids prior to the common auction expiration period to determine if there is at least one winning bid in the set of bids, the processing being performed such that the conditional bids are not considered unless the unconditional bid for the one item is unsuccessful, and such that at most only a single item from the set of N items is matched to a single one of the set of N bids when determining the at least one winning bid.

Using this approach, a bidder can control the bidding process by ranking the N bids in accordance with a desired auction resolution order. The items are auctioned based on first considering a highest ranking bid submitted by the bidders, rather than by solely considering a highest bid made for the item. Thus, each set of bids for a bidder includes at least one unconditional bid for a highest ranked item taken from the corresponding set of items, and the remainder of the set of bids are comprised of conditional bids for items ranked below the highest ranked item.

Still a further aspect of the invention includes a system and method that allow a bidder to submit a single set of bids that are considered for more than one auction. This is done generally by a system that can handle the following operations: accepting a first bid for a first auction item that is to be auctioned during a first auction expiration period; and accepting a second bid, prior to expiration of the first auction expiration period, for a second auction item that is to be to be auctioned during a second auction expiration period; processing the first bid prior to the first auction expiration period to determine if it is a winning bid for the first auction item, such that the second bid is discarded when the first bid is a winning bid; and when the first bid is not a winning bid, the second bid is processed prior to the second auction expiration period to determine if it is a winning bid for second auction item.

Thus, the first bid is treated an unconditional bid, and the second bid is treated as a conditional bid until the first bid is determined to be unsuccessful. This way, the bidder can enter even two bids, but at most only one of the first bid and second bid are declared as a winning bid.

A related aspect of the present invention allows a purchaser to more specifically bid on a right of access to one or more facilities, each of which facilities has a finite capacity for accommodating purchasers at a particular time. This aspect of the invention includes a system and method that achieve the following: retrieving access items related to the one or more facilities, the access items each corresponding to an access time available at the one or more facilities; selecting a set of access items from the access items, the set of access items being based on a selected access time and selected facility chosen by the purchaser; entering a set of bids for the set of access items, such that each bid from the set of bids includes both a bid price and a bid ranking for an access item. In this fashion, the purchaser can control through the bid ranking in what order the set of bids are considered to determine whether they are winning bids for any of the access items.

By allowing the set of bids to further include personal information concerning the purchaser (such as the purchaser's skill level at a particular task), such personal information can be compared against that of other purchasers to determine a final access time awarded to the purchaser for the access items. For example, it may be used to ensure that advanced players at a golf course are paired together at an earlier start time than more novice players, to enhance playability and enjoyment for all the participants.

In another variation of this aspect of the invention, a facility manager can participate and manage an auction inventory by dividing a capacity of the facility into a set of access time windows. This allows the capacity to be logically parceled by creating a set of access right items based on the set of access time windows, the access right items including at least an access starting time and access duration associated with performing an activity at the facility. The access right items further include a capacity value specifying a number of persons that can perform the activity at the facility during the access time window. An access time spacing can also be specified such that a plurality of access right items can be associated with an access time window, and the plurality of access right items are separated in time by the access time spacing. For instance, a particular golf tee time window may include six separate starting times spaced apart by 10 minutes for each group, so 6 separate items can be associated with a particular time window.

In still another variation of this aspect of the invention, the access items correspond to a right to play golf at a selected time and at a selected golf facility. In a further preferred embodiment, the access time awarded in the auction at the golf course does not necessarily correspond not a single specific time but rather a window of time which includes multiple potential starting times. The final determination of exact starting times is determined by grouping players according to playing ability so players will be assigned to play with other purchasers of similar capability. This same principle is extendible, of course, so that purchasers with other similar skill capabilities in other fields, or other similar attributes (age, tastes, preferences) can be paired at a common final access time.

A further aspect of the present invention includes an embodiment in which up to N separate items can be bid upon by M separate users submitting M sets of bids, and where M>>N, and such that each user's preferences are considered by examining a highest ranked bid, regardless of whether such bid is a highest bid for a particular item. Again, to facilitate and optimize the auction process, the bid prices for the items, but not the bid rankings by other users, are visible to the bidders during the common auction period.

Another aspect of the present invention more specifically concerns a method of conducting an electronic auction of a group of items within a predetermined auction time period, which method includes the following steps: receiving a plurality of bids from a plurality of potential purchasers, the plurality of bids each including a bid price for an item in the group and a bid ranking for the item; examining the bids to create a set of active bids for the item, the set of active bids being comprised only of bids having a highest bid ranking for the item and corresponding to a subset of the plurality of bids from a subset of the plurality of potential purchasers; creating an ordered set of active bids for the item based on a bid price provided for the bid; determining a minimum winning bid for the item by examining the ordered set of active bids; notifying a corresponding one potential purchaser from the subset of potential purchasers when an associated active bid for the item from the potential purchaser has an associated active bid price below the minimum winning bid; setting a selected active bid in the ordered set of active bids as a winning bid for the item when the selected active bid exceeds the minimum winning bid.

In a variation of this aspect of the invention, the associated active bid is dropped from consideration when the one potential purchaser does not increase the associated active bid price within a predetermined time period. The system then selects a next highest ranking bid as an active bid for a different item in the group for those potential purchasers not obtaining the winning bid for the item. A minimum price set by a seller of the item can also be considered in some variants to determine whether a minimum winning bid exists.

Again, in these variants of the invention, the winning bid is not necessarily determined by reference to which of the bids has a highest bid price for a respective one of the group of items.

An auction processing engine comprising another aspect of the present invention operates to conduct an electronic auction by identifying a set of highest ranked bids from bids made by bidders for the item; designating the set of highest ranked bids as active bids for the bidders; determining whether any of the active bids are a potential winning bid for the item by comparing the active bids against each other and any previously determined winning bid; designating any active bid that is a potential winning bid as a winning bid; deleting any active bids that are not designated as a winning bid; repeating some of the above steps during an auction period until no active bids remaining that are higher than the winning bid.

One variation of the auction engine also calls for the same to perform one or more of the following additional steps: notifying a bidder if an active bid for the bidder is not a preliminary winning bid, and specifying a re-bid period for the bidder to increase the active bid; accepting a new active bid from a bidder during the re-bid period, which new active bid has a higher bid price than an earlier active bid from the bidder; designating a next highest ranked bid from the bidder as an active bid for another item when the bidder does not increase the active bid during the re-bid period.

Again, in a preferred approach, any active bids for an item are designated without regard to a bid price of the bids. The auction engine can simultaneously auction a plurality of items, each with a set of corresponding active bids at the same time to determine a plurality of winning bids. A winning bid is determined by examining a highest bid price taken from the active bids, not a highest bid price taken from all bids on the item. Again, in various incarnations of the invention, each bidder can submit a plurality of bids for a plurality of items, but at most only one of the bids is declared a winning bid.

Still another aspect of the present invention relates to a more particular method of auctioning mutually exclusive items, by performing the following operational steps using a computing system configured for such purpose: receiving a listing of a plurality of mutually exclusive items from a plurality of sellers; receiving a plurality of ranked bids from a plurality of users on the plurality of mutually exclusive items; identifying a plurality of highest ranked bids for each of the plurality of users; tagging the plurality of highest ranked bids as active bids; using only the active bids to determine a plurality of preliminary winning bids for the plurality of mutually exclusive items; tagging the plurality of preliminary winning bids; eliminating all non-winning bids; identifying a plurality of next highest ranked bids for each of the plurality of users not obtaining a winning bid; designating the plurality of next highest ranked bids as active bids; comparing only the active bids and the winning bids; identifying a new preliminary winning bid for each of the plurality of mutually exclusive items and tagging the new preliminary winning bid; processing the plurality of ranked bids during a bidding period until all of the plurality of users have either a winning bid or no remaining active bids; and transmitting the results of the auction to the plurality of users.

In other variations of this aspect of the invention, the ranked bid is made to purchase a mutually exclusive item usable by a group of two or more individuals (such as a group of golf players). New ranked bids may be submitted any time before an end of the bidding period. A notice is conveyed to a user if an associated user current active bid is designated a non-winning bid, the notice giving a prescribed time frame to increase the non-winning bid. The non-winning bid is declared a non-active bid if the user does not increase the bid during the prescribed time frame.

A further aspect of the present invention includes a system for conducting an electronic auction of items, which system includes an auction controller accessible by a number of bidding computing systems; an auction inventory database accessible by the auction controller, and being adapted to store identifying information for the items; and an auction bid database accessible by the auction controller, and being adapted to store information for bids on the items, each of the bids including both a bid price and a bid ranking for an item. The auction controller is configured such that it processes the bids for the items in accordance with both the bid price and the bid ranking for the items as noted above.

A variation of this aspect of the invention includes one or more of an e-mail processor for notifying bidders of results of the electronic auction, and/or an administrative computing device for performing administrative tasks for the auction controller. The bidding computing systems (a desktop computer, a notebook computer, an intelligent terminal, a PDA, a cell phone, or some other device) is connected through a network to the auction controller.

Still a further aspect of the invention relates to a system for conducting an electronic auction of items where the system includes: an electronic auction file for storing information concerning auction items; an electronic bid file for storing a set of bids for a corresponding set of items selected from the auction file, each bid in the set of bids including at least a bid price and a bid ranking for an item; and an electronic auction processor for processing the set of bids based on both the bid price and the bid ranking for the corresponding set of items to determine if there is at least one winning bid for one of the corresponding set of items. The system is set up in accordance with the discussion above so that a user can bid on more than one item in the electronic auction, but the electronic auction processor will only generate at most a single winning bid for the user.

Another aspect of the invention relates to a system for participating in an electronic auction which includes a set of N items stored in a database of items available for auction, the set of N items being characterized by a common auction expiration period; a bid input interface for entering a set of N bids for the set of N items, the bid input interface constraining the set of N bids such that at least one one unconditional bid is provided for one item in the set of N items, and the remainder of the set of N bids are comprised of conditional bids for a remainder of the N items; and an auction processor coupled to the database of items and the bid input interface, and being further adapted to process the set of bids prior to the common auction expiration period to determine if there is at least one winning bid in the set of bids, the processing being performed such that the conditional bids are not considered unless the unconditional bid for the one item is unsuccessful, and such that at most only a single item from the set of N items is matched to a single one of the set of N bids when determining the at least one winning bid. In this manner, a user can control the bidding process and be assure of obtaining at most one item from an auction inventory.

A further aspect of the invention concerns a system for participating in an electronic auction which includes a database of auction items, the auction items including first auction items available for bidding during a first auction period, and second auction items available for bidding during a second bidding period; a bid input device for transmitting a first bid for one of the first auction items and a second bid for one of the second auction items, the first and second bids being received from a single bidder prior to an expiration of the first auction period; and an auction processor coupled to the database of auction items and the bid input device, and being further adapted to determine if the first bid is a winning bid prior to the expiration of the first auction period; and being further configured to process the second bid when the first bid is finally determined to be not a winning bid. In this manner, a user can participate in more than one auction, and have his/her bids rolled over to a succeeding auction in the event of an unsuccessful effort during a first auction.

Still another aspect of the invention pertains to an internet based system for allowing a web user/purchaser to bid on a right to play golf at a selected time and at a selected golf facility in an electronic auction. The system includes: a query interface for presenting a list of available golf playing opportunities to the purchaser, the golf playing opportunities including information identifying both a golf course and a time at the golf course available for playing golf; a bid interface adapted to allow the purchaser to enter a bid for each of the one or more golf playing opportunities, the bid including both a bid price and a bid ranking for each of the one or more golf playing opportunities, so that a set of purchaser bids are created for the one or more golf playing opportunities; an auction processor for processing the set of purchaser bids, along with third party bids for the one or more golf playing opportunities, to determine winning bids for the golf playing opportunities; and an e-mail notification system for notifying the purchaser when a currently highest ranked bid from the purchaser is determined to be a winning bid or when the currently highest ranked bid is determined to be not a winning bid. The auction processor is located on an online accessible server, and is configured: 1) to allow the purchaser to increase the bid price for the highest ranked bid within a predetermined time period when the highest ranked bid is determined to be not a winning bid; 2) to evaluate new bids until the end of the common expiration period, and until all of the purchaser bids are determined to be not winning bids, or until one of the purchaser bids is determined to be a winning bid. Using such system, a purchaser is permitted to bid on multiple golf playing opportunities using the set of purchaser bids, but at most only a single one of the set of purchaser bids is satisfied as a winning bid.

A related aspect of the present invention deals with an electronic auction program for processing auction bids for an item. This program is preferably executed at least in part at a remote server destination site, and partially at a user client side site. The program includes a first program portion for identifying a set of highest ranked bids from bids made by bidders for the item, and for designating the set of highest ranked bids as active bids for the bidders; a second program portion for determining whether any of the active bids are a potential winning bid for the item by comparing the active bids against each other and any previously determined winning bid; a third program portion for designating any active bid that is a potential winning bid as a winning bid; a fourth program portion for deleting any active bids that are not designated as a winning bid; and a fifth program portion for coordinating the first program portion, the second program portion, the third program portion and the fourth program portion during an auction period until no active bids remaining that are higher than the winning bid.

By preferably locating the electronic auction program at a computing system accessible by a plurality of user computing devices, this increases the exposure and likelihood of obtaining reasonable bids for the auction items. Thus, the computing system is preferably a server accessible on the internet, and the user computing devices include web browsers for interacting with web pages on the server for entering the bids.

Another related aspect of the present inventions includes a web based auction system interface configured for performing I/O operations between a bidder and an auction system through a browser. This web based interface includes: an auction query interface that is adapted for viewing auction items and receiving user queries through the browser concerning the auction items, and further for retrieving one or more of the auction items in response to such user queries; and an auction bid entry interface that is adapted for receiving user bids for the auction items, the auction bid entry interface including both a bid price entry field and a bid ranking field for any auction item that receives a user bid.

A variation of this aspect further includes an auction status interface for monitoring progress of an auction for the auction items during an auction period. Furthermore, the auction bid entry interface is coded so that the user can enter a plurality of bids on a plurality of auction items, with each of the plurality of auction items receiving a different ranking from any other of the plurality of auction items. This interface further allows a user to enter bids which carry over from a first auction to a second auction when the bids are not successful during the first auction.

Still another aspect of the invention concerns an internet accessible electronic auction site configured for coordinating transactions between a bidder and an auction system. This internet accessible electronic auction site includes: means for accessing auction items available for bidding; an auction query interface adapted for viewing within a web browser and configured for receiving user queries through the browser concerning the auction items, and for retrieving one or more of the auction items in response to such user queries; an auction bidding interface adapted for viewing within the web browser and configured for receiving user bid entries through the browser concerning the one or more auction items, the auction bidding interface including at least a first field for receiving a bid amount and a second field for receiving a bid ranking for each user bid entry; and an auction controller for processing the user bid entries to determine winning bids for the one or more auction items. As indicated above, this system, too, as with the others, is capable of simultaneously auctioning all the items at the same time.

Another aspect of the present invention is directed to a more particular electronic auction system that comprises: means for entering auction inventory items; and means for storing the auction inventory items; and means for reviewing the auction inventory items; and means for querying the auction inventory items to create selected auction inventory items satisfying selection criteria of a potential buyer; means for entering a bid amount and a bid ranking for one or more of the selected auction inventory items to create one or more bid entries; means storing the bid entries; means for processing the bid entries to determine winning bids for the auction inventory items, the winning bids being based on both the bid amount and the bit ranking; means for transmitting a notification associated with the winning bids to one or more bidders.

In another variation, one or more of the following subsystems are also included to enhance the appeal and utility of the system: means for coordinating payment of any winning bids; means to observe a status of any auctions; means to store user information; means to store vendor information; and means to store and retrieve historical auction results so that users can better understand the auction process, and more intelligently formulate bids appropriate for a particular inventory item.

An advantage of the invention is that it allows a user to enter bids on multiple, mutually exclusive items yet only receive the item corresponding to their highest ranked, winning bid. Yet another advantage of the invention is that it increases the probability of any one item receiving at least one bid, thus maximizing returns to sellers of such items.

The referenced system provides a highly advantageous manner to simultaneously auction mutually exclusive items. Mutually exclusive items may either be multiple items that physically cannot be possessed simultaneously or they may be more than one item that the user would not wish to simultaneously possess. This system allows the user to enter multiple, rank ordered bids that are sequentially processed. This allows the user to effectively bid on a large number of items while only receiving the item corresponding to their single, highest ranked, winning bid. This method increases the probability the user will successfully bid for one item; decreases the probability the user will be out bid at the last moment of the auction on all items of interest; significantly reduces the incentive for entering a slightly higher bid than the current winning bid at the last moment; and, significantly decreases the amount of auction involvement required by the user.

This method also benefits sellers by increasing the probability of receiving at least one bid for their item and increasing the expected winning bid amount. Consider the following case. Three bidders are bidding on three nearly identical, mutually exclusive items. All three bidders place their bids moments before the end of the auction. If all three bidders bid on the same item, two of the items receive no bids. If all three bidders place bids on all three items and rank order their preferences for each item, the bids can be processed such that each bidder receives at least one item. Assuming nearly equal preference for the three items by all three bidders, this new outcome is much preferred to the case where all three bidders bid on the same item. In the present example, all bidders receive nearly the same utility from the items they won and all sellers sold their items. This contrasts sharply with only one successful bidder and only one successful seller in the baseline example.

Thus, one significant benefit of the present invention lies in the fact that mutually exclusive items are included in the same auction or the items may be bid upon in successive auctions. In the latter case, the rank ordering of the items is constrained such that the auction closing date for each successively ranked item is the same or later than the auction closing date of the preceding ranked item.

BRIEF DESCRIPTION OF THE DRAWINGS

FIG. 1 depicts a preferred embodiment of a system for auctioning mutually exclusive items utilizing the present invention FIG. 1A shows a preferred electronic format of an auction item used in the electronic auction system of the present invention.

FIG. 1B illustrates a preferred format for an auction item of the present invention;

FIG. 2 is a flow chart demonstrating a preferred method used by an auction processing engine to auction mutually exclusive items with the present invention.

FIG. 3 is an example showing an exemplary bid and rank order listing table for a prospective bidder.

FIG. 4 is an exemplary auction cross reference table showing three items and three users with their bids and rank orderings displayed.

FIG. 5 is an exemplary table indicating the outcome of the auction shown in FIG. 4.

FIG. 9 is a preferred embodiment of a seller auction inventory input screen.

FIG. 10 is a flow chart demonstrating the general method used by a user to identify and bid upon mutually exclusive items in the present invention.

DETAILED DESCRIPTION OF THE INVENTION

Figure 6:
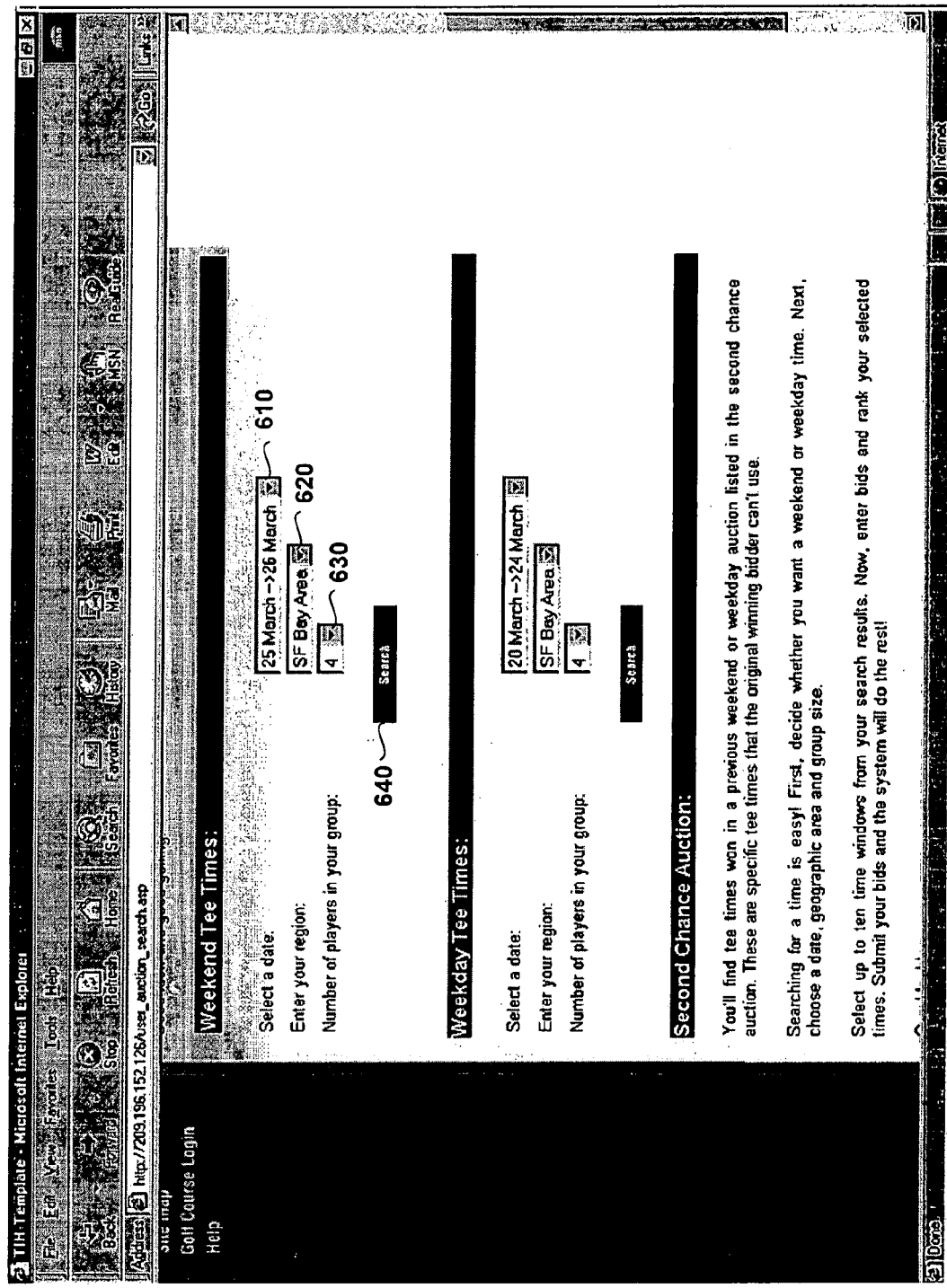
FIG. 6 is a preferred embodiment of a user query interface screen showing auction search input data fields.

A detailed explanation of the preferred embodiments is now provided as illustrated in the drawings and discussed herein.

FIG. 1 shows a preferred system 10 for the auction of mutually exclusive items. As described herein, while a preferred embodiment uses a particular tee time at a particular golf course as the "item" for auction, it will be understood that the term is intended in its broadest sense, and the invention is not limited in this respect. Thus, an "item" can refer to any number of tangible articles and intangible properties, or to a right of access or use to a particular facility (such as a travel seat, hotel room, restaurant seat, concert seat, etc.) Moreover, the term "mutually exclusive" in this regard is meant from the perspective that a would-be purchaser is perhaps only interested in owning one of the items (i.e., such as only one tee time on a particular day) even if he/she bids on more than one item at a time, and/or that it is not possible to own more than one item at a time because they are inconsistent, incompatible, etc. (i.e., such as owning the same tee time at two different locations).

A Central Auction Controller (CAC) 100 manages all data input and auction bid processing for any items that are involved in an electronic auction. Any number of sellers can enter item inventory for auction and view auction status and results using I/O devices 105, 115 which are attached to computers 110, 120 that exchange data with CAC 100. The sellers login to an electronic auction system 10 using their respective I/O devices and CPUs 105, 110, 115, 120 which transmit necessary login information to CAC 100. CAC 100 verifies seller login information or allows the seller/vendor to establish a new vendor account in one or more databases represented by database 155, such as vendor database 170. Once logged into system 10, sellers may list inventory for auction using I/O devices 105, 115 and their respective CPUs 110, 120. Seller CPUs 110, 120 thus transmit auction inventory information to CAC 100 where is it stored in an auction database 165. Sellers may also query CAC 100 regarding results of previous auctions, and can request that CAC 100 retrieve auction results from auction database 165 and transmits the same back to the sellers. The I/O devices 105, 115 and CPUs 110, 120 used by the Sellers can consist of conventional modem communication devices, personal computing systems, and devices which combine such functionalities (i.e., such as a PDA). Preferably, of course, the Sellers can access CAC over a network, such as the Internet, using a conventional browser viewing a website page (not shown) maintained and controlled by CAC 100, or through a wireless network connection as provided by an intelligent cell-phone, PDA, etc.

Potential purchasers of the items for auction can view open auctions and review the results of previous auctions using the I/O devices 125, 135 which are attached to computers 130, 140 that exchange data with the CAC 100. These devices can be of the same type as used by the Sellers noted above. Again, too, prospective purchasers are preferably given access to auction data over a conventional Internet link and using a conventional browser to maximize the availability of the auction information, or through a wireless network connection as provided by an intelligent cell-phone, PDA, etc. Users login to system 10 using I/O devices 125, 135 and their respective CPUs 130, 140, which transmit appropriate login information to CAC 100. CAC 100 verifies user login information or allows a user to establish a new user account in user database 160. Once a user is permitted access into system 10, they can submit an auction inventory query and thus cause CAC 100 to search auction database 165 for inventory that meets user input query parameters (defined in more detail below). The CAC 100 transmits the auction search results for display on the user I/O devices 130, 140. Inventory included in the searchable database may all have the same bid closing date and time. However, the inventory available for bids may also have different bid closing dates. In the case of different bid closing dates, the rank ordering of the items must be such that the auction closing date for each successively ranked item is the same or later than the auction closing date of the preceding ranked item.

System users enter bids for auction items on their respective I/O devices and CPUs 125, 130, 135, 140 that are transmitted to the CAC 100. These bids (which include more than just price information as discussed in more detail below) are stored in auction database 165. CAC 100 processes bids as they are received, and sends notifications to users via an e-mail processor 175. Upon close of an auction bid time window, CAC 100 processes all outstanding bids and determines any winning users for each of the auction items.

Administration of the auction process is performed through I/O device 145 attached to administrative computer 150 that exchanges data with CAC 100. As noted earlier, CAC 100 stores and retrieves relevant user, auction and vendor data from databases 155, which databases may be located at one server, or potentially many different servers accessible to CAC 100. In particular, user database 160 stores registration data for system users, such as names, addresses, identification numbers, payment information, etc. A system administrator can login to system 10 to check the status of current auctions, to update user or vendor information or perform other normal maintenance of the system via their I/O device and CPU 145, 150.

Auction database 165 stores records of the inventory of items available for bid, current bids and results of previous auctions. Seller database 170 stores registration data for sellers, including names, addresses, and any other desired information appropriate for the item inventory. CAC 100 also controls an e-mail processor 175, which, as noted above, is configured to send messages to users, sellers and an administrator, to inform them, for example, of item auction status, reminders, item particulars, etc.

The particular details of the hardware described above are not material to the present invention, and therefore are not discussed at length here. It will be understood by those skilled in the art that any number of different commercially conventional computing systems could be configured in an appropriate and conventional fashion for the purposes needed to achieve the present objectives.

FIG. 1A shows a preferred electronic format of an auction item 178 used in the electronic auction system 10 of the present invention, which includes at least an ID field 180 for uniquely identifying a particular item. As discussed earlier, an "item" in the preferred embodiment represents: (1) a right of access to enjoy some activity (in this case to play golf indicated by an item descriptor field 181; (2) at a particular location (golf course) indicated by location field 182; (3) at a particular time (tee time) indicated by time field 183; (4) for a particular duration indicated at duration field 184; and finally (5) a quantity of the items available at quantify field 185 (defining the size of the group of item(s) which can be a numerical value greater than or equal to 1). Thus, for each item (or group of items), information for at least these five parameters are presented to a user during the bidding process, as seen in FIG. 1A. Furthermore, each item will typically have associated with it an auction expiration date field 186, which defines an auction time window in which bids will be processed from various users. An additional minimum price field 187a is used to set a minimum bid price for the item, if that is desired. A reserved price field 187b designated "guaranteed price" might be used in some applications, which can represent a numerical value for which if a bid is received, the user is guaranteed to receive the item in question without further bidding. This option might be of use, for example, so that sellers can set visible reserve prices. Additional fields for other administrative information (such as payment requirements, spacing between tee times, group sizes, etc.) can be provided in additional fields (not shown) as desired based on the nature of the particular item, system, etc.

A user bid entry 179 is shown in FIG. 1B. This includes a user ID (field 188a) user bid price (field 188b) and ranking (field 189) and optional information (field 190) are also provided and are filled in by the individual bids provided by users as indicated below. Other information relevant to such bid entry 179 (i.e., such as the item ID number 180, a user's maximum bid price, a user's skill level, etc.) is not shown here but are understood to be implicit to the extent they are useful for implementing the benefits of the present invention.

The particular types of fields used in auction item 178 and used in bid entry 179 in any environment will vary, of course, from application to application, so it will be understood by those skilled in the art that the foregoing is merely the preferred approach used in the present embodiments.

In the case where all displayed inventory items have bid on by the user have the same auction expiration date 186, the values entered in the ranking field 189 for any particular bid may follow any desired order. However, in the case where the auction expiration dates 186 are different for the selected inventory bid on by the user, the values entered in the ranking field 189 are preferably constrained to simplify the auction process. In the preferred embodiment, a ranking for an item in an earlier auction closing date must always be higher (more preferred) than any ranking given to an item in a later auction closing date. This is done to ensure that all bids for each auction will be resolved before the next auction closing date. This approach thus guarantees that at any moment in time the pool of outstanding bids consists of only the set of highest ranking bids from each user and that no bid more preferable for any user is being ignored.

Some users of the present invention on the vendor side may wish to have an item correspond to multiple, rather than single rights of access, so that, for example, an item might represent a tee time for four players, rather than one, so that the inventory can be packaged and managed in this fashion instead.

Already one significant difference to the prior art is apparent, in that the "items" 178 and bid entries 179 of the present invention are distinct from the access rights auctioned at some prior art electronic auction sites where, for example, the user is only permitted to specify a date, and then an embarkation location followed by a disembarkation location. There is no ability to control or specify a particular seat, or even a particular flight in the prior art system. Of course, additional information could be specified for the item depending on the environment in which the invention is practiced, and it is expected that some degree of routine fine tuning will be necessary to optimize the capabilities and performance of any such system.

FIG. 2 illustrates a method used in a system implementing the preferred embodiment. For any particular item 178 listed for inventory in an electronic auction system 10, the system processes submitted "bid" information from entries 179 at step 205, which, bid information again, in a preferred embodiment, consists of at least the following information extracted from the participating user formatted bid entries 179: (1) a numerical value representing the price they are willing to pay for the right to play golf at the particular course and time (in bid amount field 188b) and the user ID (field 188a); and (2) a ranking representing the user's evaluation of the item relative to other items he/she has bid on in the particular group of items available in inventory (in bid ranking field 189). From another perspective, the bids made by the user on a group of items—other than the highest ranked bid which is a form of unconditional bid—can all be considered "conditional" bids in that each lower ranked bid has an existence that is conditioned on the non-fulfillment of the user's next highest ranked bid. The use of such conditional bids, therefore, is a new feature introduced by the present invention which allows an easy and flexible experience for the user, especially when used in conjunction with unconditional bids.

Again, in other environments it is possible that other user information might be collected as part of the bid in optional field 190, such as a time limit expiration for the bid, a maximum value the user is willing to bid, an auto-bid feature, and similar types of data. For purposes of the remainder of the discussion below, these three fields 188, 189 and 190 define the "bid" as offered by the user. However, some additional fields, including Active/Inactive Bid field 191 and Winning/Non-winning Bid field 192 are used by CAC in connection with each user bid as explained below. Initially, these status fields, or tags, are preset to Inactive and Non-winning respectively for each bid submitted to CAC 100.

CAC 100 is continuously monitoring for new bids on items, and adjusts a status for an auction item whenever a new bid is received within the auction time window, and at the auction expiration time. Thus, at step 210 it reviews all user bids and for each user tags a highest ranked bid (i.e., the bid with the highest value in field 189 for the particular user) with a designation Active Bid by setting flag 191 for the bid. At 215, all bids set as an Active Bid or as a Winning Bid for an item (or group of items) are put in a first grouping, and ordered from highest to lowest for a particular item. Again, because an item may be able to accommodate more than one user (i.e., it may represent four separate tee opportunities at the same time, or there may be an indication that there are four times available in the item quantify field 185 so that there can be four winning bids), there may be more than one winning bid per item. Thus, the present invention accommodates situations where items can be grouped (depending on how similar they are) and be auctioned together. If the inventory is listed for auction in blocks of multiple similar items, the number of items in the block determines the number of winning bids, which thereby sets the minimum winning bid level 217. If there is only one item in each inventory block, the minimum, winning bid will be equal to the highest Active Bid. Thus, a Minimum Winning bid value is determined at step 217 by ranking all ordered Active Bids and Winning Bids and selecting a bid value that is equal to that bid from this set that corresponds to the xth from the top, where x represents the number of items. Thus, the bid in the xth sorted position represents the lowest possible winning bid for one of the x items; again, in some situations, x may be equal to one.

At 220 a determination is made as to which if any of the ordered Active Bids and Winning Bids are higher than the Minimum Winning bid 220. If a particular Active Bid is higher than the Minimum Winning bid, such Active Bid is tagged (by setting the Winning bid field) as a Winning Bid at step 225. In addition, the sorted Active Bids and Winning Bids might be subjected to satisfying a second condition before they are declared Winning Bids, by comparing them to a reserve or minimum bid value provided by the seller. If necessary (depending on the number of user bids, and the number of items in the group for auction) the older lowest bid that has a Winning Bid designation (which is now supplanted by the newer higher amount in the new Winning Bid is then re-designated as an Active Bid now. If there is sufficient time remaining before the bid window closes, the user who originally provided the re-designated bid is notified at 230 that they have been outbid. Note that, in this regard, typically the "bidding window" available to users to submit bids will be shorter than (or expire before) the auction expiration period, to allow the system to properly handle any last minute provided bids. If the outbid user does not increase their bid within a specified time frame at step 235, their bid is designated Inactive Bid at step 238 and such user's next highest ranked bid (if such exists) is tagged Active Bid 240. If the user increases their bid during the available time period, then the bid remains an Active Bid and the maximum bid amount for that bid is increased to the new amount entered by the user at step 245. If there is not sufficient time before the bid window closes to process/send a notification, the Active Bid expires at the end of the bid window and the user's next highest ranking bid becomes their Active Bid 240.

A determination is made at step 250 as to whether the bid window has closed by checking field 185. If bidding for the item is not closed, the bid—now having the designation Winning Bid—is returned to the pool of outstanding bids to be examined and at 215 system 10 again goes through the process of ordering outstanding Active Bids and Winning Bids. If the bidding window is closed, a determination is made at step 255 about whether any Active Bids remain. If such bids remain, step 215 is again repeated. When there are remaining Active Bids, this means that not all Winning Bids have been resolved, and that they must be rendered into Inactive Bids or Winning Bids by the auction resolution process. If no Active Bids exist, the Winning Bid(s) are declared as winners at 260. Winning bidders may then be notified through e-mail. All bids for the item are considered processed when the highest ranked remaining bid for all users is either set as a Winning Bid or an Inactive Bid. One benefit of the present invention, therefore, lies in the fact that a multitude of items can be resolved simultaneously, and with a multitude of potential winners. Since winners are not notified until the end of the auction time window, there is also no collusion possible between buyers to try and guess or experiment with artificial bids in an effort to glean any reserve price set.

Any Active Bids below the Minimum Winning Bid are thus routed at 220 for further processing if bidding is still open. If a user bid has a Winning Bid status, but is nevertheless lower than the minimum winning bid, such bid is given a designation Active Bid at step 228 by setting such status in field 191. After step 228 therefore, the only bids that are Active Bids are those that do not exceed the Minimum Winning Bid level. Some time after this, a message is sent at step 230 to notify the user and inform them of a time frame (which may or may not correspond to the end of the bidding period) during which they may increase their current active bid. If the user does not increase the value in field 181 for the Active Bid for the item during the available time window, their Active Bid is then given a designation (by setting field 191) as an Inactive Bid at 238. An Inactive Bid designation represents the fact that it is no longer active, or in the pool of outstanding bids to be considered for the item's auction. Of course, in those applications where a maximum bid amount option is presented to the user (for inclusion in field 190), the value specified in this field can be compared first against the Active Bid amount to determine if the Active Bid amount can be increased without resorting to notifying the user. In this fashion, the user can avoid having to re-bid in a controlled fashion below a threshold limit of their choosing.

In any event, if the user does not respond in time, the user's next highest ranked bid then receives the designation tag of Active Bid at step 240 and this next bid is now submitted to the pool of outstanding active bids and again goes through the process of ordering at 215.

If the user's Active Bid is increased at step 235 within the available defined time window, an Active Bid Amount parameter is increased by system 10 at step 245 to reflect such new amount as set out in field 181. The now updated Active Bid returns to the pool of outstanding active bids and again goes through the process of ordering at 215.

At step 250, a determination is made concerning whether the item's bid window has been closed. If so, all Active Bids for the item are identified at 255; at this stage, a resolution of all bids as Winning/Non-Winning, or as Active/Inactive, might not have been finalized. If there are any remaining Active Bids, this means that not all Winning Bids have been resolved, and that they must be rendered into Inactive Bids or Winning Bids by the auction resolution process.

The timing between the close of bidding (i.e., the bid window close) and the determination of final bid results, or auction close, is configured such that there is a sufficient interval between when the last, new bid is accepted by CAC 100 and when the auction results are finalized so that all bids are processed and determined, in the end, to be either Winning Bids or Inactive Bids.

Upon determining the final winning bids 260, payment for some portion of the winning bid amount may be finalized at step 265, based on payment information provided earlier by the user (i.e., such as a credit card number) Notifications are sent by E-mail or other suitable means to notify winning bidders 270. These notifications confirm the commitment for sale by the seller and include information such as the date, time and location of the item, confirmation of the credit card transaction and a confirmation code or other identifying information for verification purposes.

FIG. 3 shows a portion of an exemplary user auction item data input table 300, which the user may access at any time to see the status of his/her bids. The user interacts with table 300 (as part of an appropriately designed input screen discussed below) and such table contains at least some of the bid information noted above for each item 179, in bid amount field 188*b* and bid ranking field 189. In its simplest form, user input table 300 is created for each separate user having an ID with the system, and consists of at least three columns of information; it is understood of course that it may include other information relevant to the particular user/system. Item Description column 310 contains an item number or item description for the auction items (which can be obtained from item ID field 180 or item description field 181). The Bid column 315 contains a bid amount input by the user for each of the items shown in the first column, as will be used for bid amount field 188*b* above. The Rank Order column 320 contains a relative ranking input by the user for each of the items shown in the first column which will be used for bid ranking field 189 noted earlier. As explained earlier, any mutually exclusive items bid on by the user must either all be included in the same auction, or alternatively the items may be in successive auctions. In the latter case, the rank ordering of the items is constrained by the data input entry mechanism such that the auction closing date for each successively ranked item is the same or later than an auction closing date of a preceding ranked item. The rankings are controlled so that they range from one to N, where one represents a highest selection, and N the lowest selection for the N items bid on by the buyer. Again, as explained above, all the bids by the user can be considered conditional bids, in that each is utilized in the auction process/becomes actualized or unconditional only when the immediately preceding, highest ranked bid is declared an Inactive Bid.

The preferred method, therefore, allows two separate constraints (price and rank) to be used for an auction process, as opposed to the prior art, where only a single constraint (price) is used. In the preferred method, no ties are allowed for the ranking process. All items must be ranked relative to each other, and suitable control/filtering logic can be employed to ensure that this is done (through form auto-filling features if necessary) before the user finishes completing data entry. It should be apparent that the data needed from the user for these entries can be provided in any conventional fashion by the user, such as through an interaction with an HTML page, a Java based applet, etc. The individual user input tables 300 in a preferred system are viewable, modifiable, etc., only by the user creating the same for privacy and security reasons.

An important facet of the present invention is that the user is permitted to aggregate or create collections of items representing an expression of his/her bidding desires with ease and flexibility, even across auction window boundaries. These collections of items are not defined by system 10, but rather, under the control and specification of the user. In this manner, the user is allowed to define a bidding strategy that permits them to obtain at most 1 of the N selected items as a final selection, even across different auctions. In other words, when the user only wants or desires one golf tee time, for example, they are allowed to express and define a multitude of potential choices of dates and times, and propose a bid and ranking for each, even if they occur in different auction periods. This is in contrast to the prior art where, for example, in order to bid on a multitude of items, the user is required to make an irrevocable commitment on each, and in the end, he/she could end up having to purchase more than what they wanted. Furthermore, the user is also constrained in such systems to bid only on one auction at a time, and he/she cannot "roll over" their bid to another auction as in the present invention. In this regard, system 10 is intelligent enough to realize that the user actually only wants one of such choices, and therefore it operates on his/her behalf to find a selection that best matches the particular user's price/ranking constraints, even if multiple auctions must be resolved to satisfy such selection. While the user may not obtain his/her first choice, they are guaranteed that they will not end up with more than one of their selections.

Nonetheless, the present invention has the ability to seamlessly mimic the functionality of the prior art (if such is desired) by allowing the user to define yet another set of items for which he/she wants to bid. From a practical perspective, there is no limit to the number of distinct user input auction tables that can be associated or used by a single user. For example, a user may bid on one collection of items corresponding to a single tee time at a particular course, and a separate collection of items corresponding to a single tee time at a different course. Similar situations could be set up for each distinct group of items the user wishes to bid on.

FIG. 4 depicts how a cross reference table of users and items for an auction can be compiled from the auction items 178, bid entries 179, and auction status information gleaned from the aforementioned auction process itself depicted in FIG. 2. 400. To simplify the present discussion, in this example it is assumed the auction closing date for all items in the table is the same, but the resolution of cases where they are not the same will be apparent to those skilled in the art from the present teachings. Item descriptions (from ID field 180 and/or other fields 181-185) are shown in the top row of the table 405. User identities (from user ID field 188*a*) are contained in the first column of the table 410. Each cell of the table shows a current bid amount and rank order for each respective item by each respective user 415. As seen in FIG. 4, each of Item 1, Item 2, Item 3 have received three bids from three separate users, with Item 1 ranked highest by User 1 and User 3, and Item 3 ranked highest by User 2. To begin the auction, since User 1 and User 3 have ranked Item 1 the highest and User 2 has ranked Item 3 the highest, these bids would be initially identified, tagged and sorted as Active Bids to be considered when determining a Winning Bid for each item. However, the bid by User 2 on Item 1, while higher in value than either the bid from User 1 or User 3, would not be used during the auctioning process of the present method unless it were designated already as an Active Bid for User 2 (i.e., in the event Item 3 had already been auctioned, and User 2 had not received an indication of a Winning Bid).

The auction cross reference tables 400 in a preferred system are viewable, modifiable, etc., only by a system administrator for privacy and security reasons. However, it may be desirable and in fact advantageous to permit individual users to see the status of particular auction items in some fashion in order to optimize the bidding process. While the specific types of visual output for the users are discussed in detail below (in connection with FIGS. 6, 7, 8, 9 and 10), it can be noted even generally at this point that to control the dynamics of the bidding process, a variety of choices concerning the information presented to the participants from auction items 178, bid entries 179 and the auction status can be effectuated to influence the behavior of the participants and thus optimize the sale of the inventory and the satisfaction of the auction participants. For example, it might be desirable in some cases to control shielding of the identity of the auction participants, to discourage collaboration/manipulation of the auction process. Furthermore, it might be desirable to control what bids are shown for an item. As an example, the system may allow only the highest ranked unconditional bid for an item to be seen by the auction participants, rather than the highest ranked overall bid (conditional or unconditional) for an item. In addition, it might be beneficial to provide at least some information about the number of conditional bids for an item, and their bid value, again to help inform users and motivate them to bid appropriately for items. Information on a user by user basis (such as the value of an unconditional bid, the number of unconditional bids, etc.) may or may not be provided to other users. These are but example, of course, and it should be apparent that any one or more of these controls, some variation/combination, or some other control might be used to better stimulate and maximize the bidding process for any particular auction environment.

Thus, in a preferred embodiment of the present invention, while the highest unconditional bid information is available for viewing by users for the individual items, the ranking information of each user is preferably not made visible. Therefore, there is no mechanism in the preferred embodiment by which User 1 and/or User 3 can know that it is User 2's bid, and/or that it is only a second-ranked (conditional) bid. Instead, such users see only that there is at least one unconditional bid that is as high (or more) than the highest ranked unconditional bid, and will have to take this figure at face value as a potential Active Bid for the item unless User 2 is satisfied by some other auction item (i.e., such as Item 3) and thus drops out of consideration for Item 1. This is because they do not know whether the bid by User 2 on this item might be processed because the latter's unconditional bid on another item might not be satisfied. In this fashion, therefore, bidding for items is maximized from the perspective of the seller, since many more bids are obtained and processed. Even if some of them ultimately may not materialize into real purchases because they are only conditional bids, their mere existence is enough to increase the demand for the item, and thus the potential bid price. To prevent bid manipulation, the various user bids can be made non-retractable, so that users cannot reduce their bids if it turns out that a potential co-bidder is eventually eliminated. For example if a user 1 submits a bid at X+1$—because he/she sees a bid at X$ by user 2—user 1 is preferably not allowed to change the bid (or ranking) later to take advantage of user 2's withdrawal. In the preferred embodiment, a graphical representation indicates the number and amount of bids that are not currently Active Bids or Winning Bids and clearly indicates the status of conditional and unconditional bids. For example, the table may indicate the number of next highest ranked bids for all system users that are as high or higher than the current winning bid amount. As a further refinement, the system may show the number of bids exceeding the current winning bid versus the relative rank order of the bids (i.e., by grouping the bids based upon whether they are the next highest ranked bids, two rank orders higher, three rank orders higher, etc.).

FIG. 5 illustrates in more detail how an auction process illustrated in FIG. 2 of the present system would utilize an auction outcome table 500 to determine and record the outcome of the various bid entries entered in auction cross reference table 400 in FIG. 4. The item IDs are shown in the first row 505 and the user IDs are listed in the first column 510. For simplicity, it is assumed that no bids are increased and that Item 1, Item 2 and Item 3 are to be auctioned simultaneously with the same auction closing. In this example, system 10 first tags user bids ranked highest (i.e., with a #1 rating) as Active Bids; thus, bids 515, 540, 545 are initially designated as Active Bids. User 1's Active Bid 515 is tagged Winning Bid because it is higher than user 3's Active Bid 545. User 2's Active Bid 540 is tagged as a Winning Bid because there are no other Active Bids or Winning Bids for Item 3. User 3 is notified they must increase their Active Bid for Item 1. In this scenario if no bid is increased, User 3's Active Bid 545 is tagged as an Inactive Bid and User 3's second ranked bid 560 is now tagged Active Bid.

In a second iteration, User 3's second ranked bid 560 is tagged as a Winning Bid for Item 3 because it is higher ($13) than User 2's first ranked bid ($12) for Item 3. User 3's second ranked bid has previously changed from a purely conditional bid to an actual bid at step 210 (FIG. 2). At this point, nothing has changed for Items 1 and 2, so they are not considered in this iteration. User 2's bid 540 for Item 3 is now re-designated from a Winning Bid to Active Bid. User 2 is notified they must increase their bid, or potentially lose Item 3. Again, in the event of no increases, User 2's Active Bid 540 is tagged as an Inactive Bid and their second ranked bid 530 for Item 1 is now tagged as their Active Bid. In other words, as for User 3 earlier, User 2's second ranked bid (which was only conditional before) becomes converted into an actual bid for the auction process.

In a third iteration, User 2's second ranked bid 530 for Item 1 is tagged as a Winning Bid because it is higher than User 1's first ranked bid 515. User 1's first ranked bid 515 is tagged Active Bid and a notification is sent to increase the bid. Assuming no increase, User 1's Active Bid 515 is tagged Inactive Bid and their second ranked bid 520 is tagged Active Bid.

In a fourth iteration, User 1's second ranked bid 520 for Item 2 is tagged as a Winning Bid because it is the highest, and only outstanding, Active Bid on Item 2. The auction for all three items is now completed because all three users each have a bid that is tagged as a Winning Bid. As a final result, User 1 is declared the winner for Item 2, User 2 is declared the winner for Item 1, and User 3 is declared the winner for Item 3. Thus, the auction process for the group of items is resolved with reference to considering both the items and bids collectively at the same time, rather than on considering only one item at a time, or one bidder at a time.

While the situation involving an increase in bid is not discussed specifically above, it is apparent that this event merely requires yet another iteration to be processed for the item in question. Some observations can be made about the bidding process of the present invention, including the following:

(1) An item does not necessarily go to the user submitting the highest bid (see e.g., Item 2) since there is an extra dimension of ranking involved which modifies the auction behavior and resolution process. Nonetheless, assuming no minimum bid amounts, whenever the number of bidders exceeds the number of items and every item is given the highest possible ranking by at least one user, each item should be successfully auctioned. While it is possible that an item might not be the subject of a successful bid if it is not given the highest possible ranking by at least one user, this could be avoided by requiring that every user make a bid, even a conditional one, on every item in the group. Even if the bid is very low, this approach at least guarantees to the seller that the inventory will be disposed of, and encourages buyers to make higher bids for the items they really want (to avoid being forced to accept their lower ranked selections).

(2) The existence of many bids (the unconditional highest ranked bid and the lower ranked conditional bids) can result in a higher overall winning bid when at least some outstanding bid information is presented to users (see, e.g., Item 3, where the bid by User 1 can influence the bids by User 2 and User 3) thus increasing the profitability to the seller, (3) While the seller's profitability is increased because bidding is encouraged on multiple items (since the user is only accountable for one item in the end he/she feels more at liberty to put in a bid for more than one item) the resolution of the auction is done in a manner that considers first the ranking constraints provided by the users, rather than the pricing parameters set out by the bidder or those associated with the item. In other words, the process is driven from the perspective of finding a winning bid for each user based on their highest ranking, and he/she is allowed to change this bid as needed to maximize their satisfaction and price constraints.

(4) The types of items that can be auctioned simultaneously can be expanded to include such things as those involving access of some kind, such as transportation (airplane, train, bus, etc.) seats, restaurant seats, theatre/concert seats, sporting event seats, and/or to groups of similarly related tangible articles such as collectibles, coins, stamps, books, antiques, recordings, paintings, furniture pieces, clothing, jewelry, automobiles, appliances, electronic devices (computers, stereos, VCRs, TVs, cameras, etc.) real properties, office materials, food, and other consumer staples and/or to groups of similarly related tangible articles such as grains, chemicals, packaging containers, wood pulp or other industrial raw materials and/or to groups of similarly related industrial things such as those involving access of some kind, such as freight transportation (airplane, train, truck, etc.), pollution permits, water rights or other such industrial requirements.

(5) The process can be extended to N items logically grouped in some fashion, and M separate users competing for this group, so that each of the N items is the subject of a corresponding single Winning Bid from one of the M users. This type of auction situation is not easily (if at all) resolvable using prior art techniques, and yet the present invention accomplishes a fair result that is appealing to both buyers and sellers. Moreover, it allows a user to enter a bid for a single item that may be handled across multiple successive auctions, and thus allow the user more flexibility and control for ultimately satisfying a particular item need. By automatically rolling over the user's highest ranked bid to an item in a successive auction, the user is guaranteed ongoing participation with a minimum of interaction/monitoring and involvement.

In a related variation, to smooth out the computational load on CAC 100, system 10 can restrict and categorize an inventory of items so that during any particular period, a predetermined number of items are resolved on a regular basis. For example, it is probably better to schedule a resolution of 100 items daily, rather than 700 items at the end of the week. Using a number of conventional programming techniques, the inventory can be controlled and managed so that users cannot overload a particular resolution period with too much inventory.

FIG. 6 depicts a preferred user item search input screen as it would appear within a user's browser loaded with a web page containing data entry fields that are appropriately configured to participate in locating inventory items 178 in an auction search from databases 165 and 170 (FIG. 1 above). To conduct a search, the user first selects a range in date entry field 610 corresponding to the dates on which they wish to play. The user inputs a region in region entry field 620 which they wish to review available tee times. Finally, the user inputs the number of players in their group in group size entry field 630. The number of players in their group may be different then the golf courses' normal group size. For example, a user may have a group of two people, themselves and one other person. However, golf courses normally send out groups of four persons. In this case, the user would normally expect their group, if they successfully bid, to be paired with two additional golfers. Other environments where the invention is used may or may not have such groupings, of course.

After inputting the necessary information, the user submits their search criteria by pressing a Search command button 640. Results of the search are displayed on a new page, in the form of a search results page 700, as illustrated in FIG. 7 generally.

Figure 7:
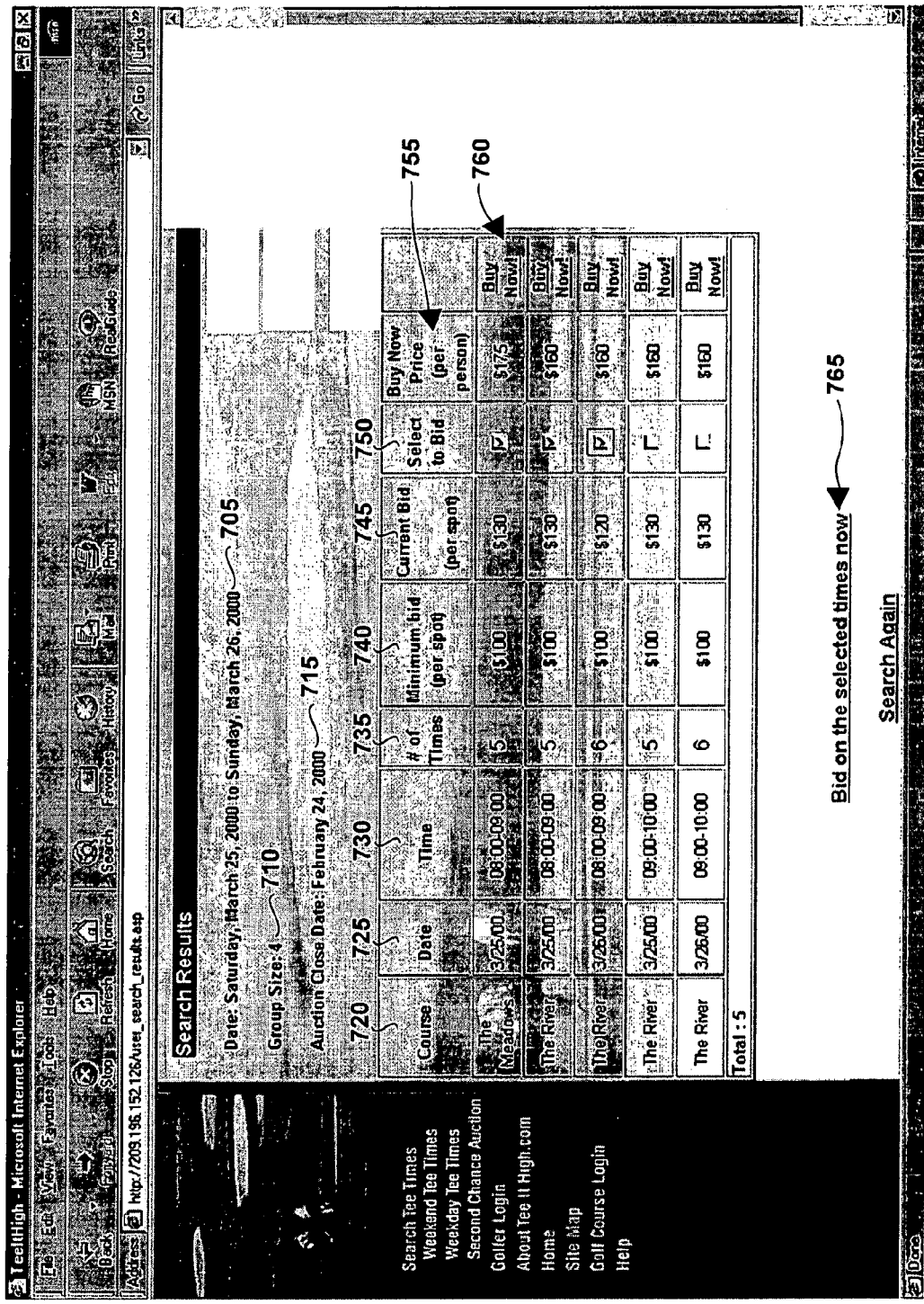
FIG. 7 is a preferred embodiment of a user search results interface screen showing auction search output data fields.

FIG. 7 illustrates a preferred embodiment of a user search results page 700 as it also would appear within a user's browser. In this example, the search result page is specifically tailored to display searches of available golf tee times from available auction items 178 matching the user's criteria. Page 700 displays the search criteria including a date range 705 and group size 710 corresponding to the user's selection. In addition, search results page 700 includes a number of data fields visible to the user, which, as mentioned above, can be tailored to display various types of information adjusted to the specific needs, desires, design goals, etc. of a particular auction system. In the present preferred embodiment, page 700 includes at least an auction closing date indicator for the selected display times in field 715. In this instance, the specified auction closing date in field 715 is the same for all displayed times. However, it is possible, as mentioned earlier, to have multiple auction closing dates for the available inventory. Search results page 700 also shows a golf course name in field 720, a date of an available time for each item in field 725, a time window for the item in field 730, a number of inventory items available in such time window of the size specified by the user in field 735, a minimum acceptable bid or reserve price in field 740, a current winning bid level in field 745 (which, as noted above, is preferably the highest unconditional bid), selection fields 750 for each available inventory item, a guaranteed price in field 755 indicating an amount which the use can bid so as to guarantee purchasing an item without further processing in the auction process described earlier and an purchase selection button 760 that allows the user to immediately buy the inventory item at the price specified in field 755.

The user has three options from search results page 700. They can return to search criteria input screen 600 by pressing a conventional back button on their browser and change their search criteria if desired. Or, they can immediately purchase a tee time within one of the time windows by pressing Buy Now button 760 next to an inventory item of their choice. Or they may elect to enter the auction process by selecting one or more inventory items for bid by selecting the respective selection buttons in field 750 next to the item of interest 750. Upon selecting one or more items for bid, the user submits their items of interest for bid entry by pressing Submit button 765.

Figure 8:
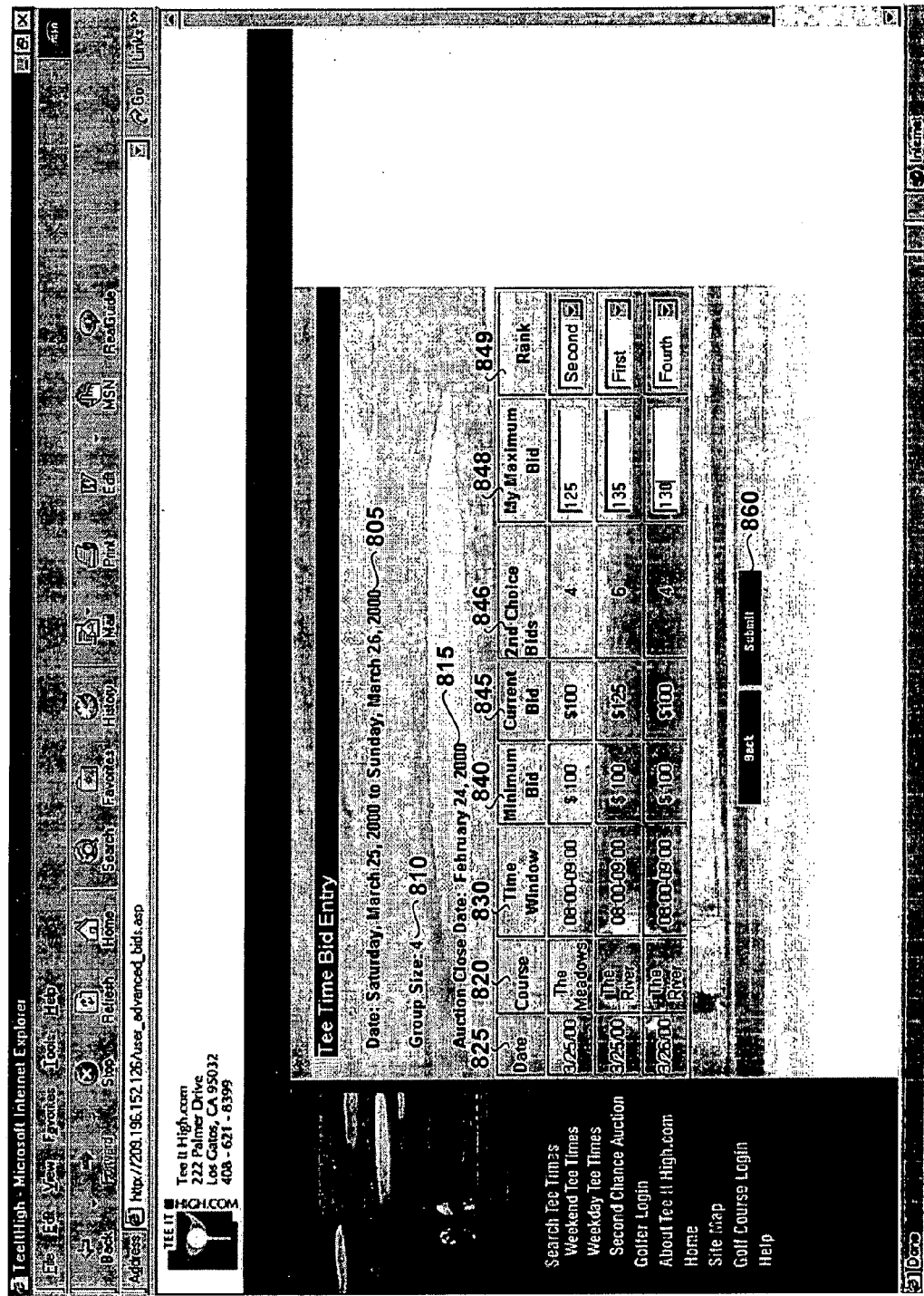
FIG. 8 is a preferred embodiment of a user bid entry interface screen showing a completed bid entry page.

FIG. 8 depicts a preferred embodiment of a user bid entry page 800 as it would appear within a user's browser, and as used to create bid entries 179, table 400, etc. Again, in this embodiment the user bid entry screen is tailored specifically for entering bids on golf tee times. This page combines some of the results from a search of all available tee times as shown earlier in FIG. 7, based upon the user-defined parameters selected there—i.e., by the user's selection in field 750 of the top three items in screen 700. With reference to FIG. 8, the use of like numerals here is intended to represent the corresponding feature from earlier figures unless otherwise noted. For example, date range 805, group size 810 and auction closing date 815 are the same as noted above for their counterparts. Similarly as for FIG. 7, for each line item, screen 800 displays tee time window date 825, golf course 820, desired tee time time window 830, minimum bid 840, and current winning bid amount 845. The new display fields in this screen include, however, a a first field 846 identifying a number of conditional bids higher than current winning bid (which can be gleaned easily with reference to the auction items 178 and user bid entries 179) and two additional fields for user bid input at 848 and 849. Other potential entry fields, such as for specifying personal data about the user (payment information, skill level, etc.) are not shown, but, of course, could be implemented in any conventional fashion.

The first bid input field 848 is provided for the user to identify a maximum bid for each tee time window that they bid on. The second bid input field 849 is provided for the user to identify a rank ordering of the items, in this case, the tee time windows. As noted earlier, this input capture screen 800 ensures that the rank ordering provided by the user is constrained such that each tee time window has a unique rank in field 849. The ranking can be provided in any convenient form, and in the present example, textual descriptions are used, but other numerical designations could be employed instead. The ranking ordering constraint is also imposed in a manner that requires that items having an earlier auction expiration period must receive a higher ranking. For example, an item with an auction closing date of Jan. 1, 2000, must be given a higher ranking than an item with an auction closing date of Jan. 2, 2000. In the event that the first item is not successfully acquired by the user, the present invention automatically designates the next highest ranked bid as the active bid, and this can occur even across items having different auction closing times. In this way, a user can enter a single bid, and yet have such bid carried over multiple auctions until they achieve a successful result.

Upon entering a maximum bid and rank for each selected tee time, the user submits their bids by pressing Submit button 860, and they are thereafter processed in the manner explained above with reference to FIGS. 1, 2.

Figure 9:
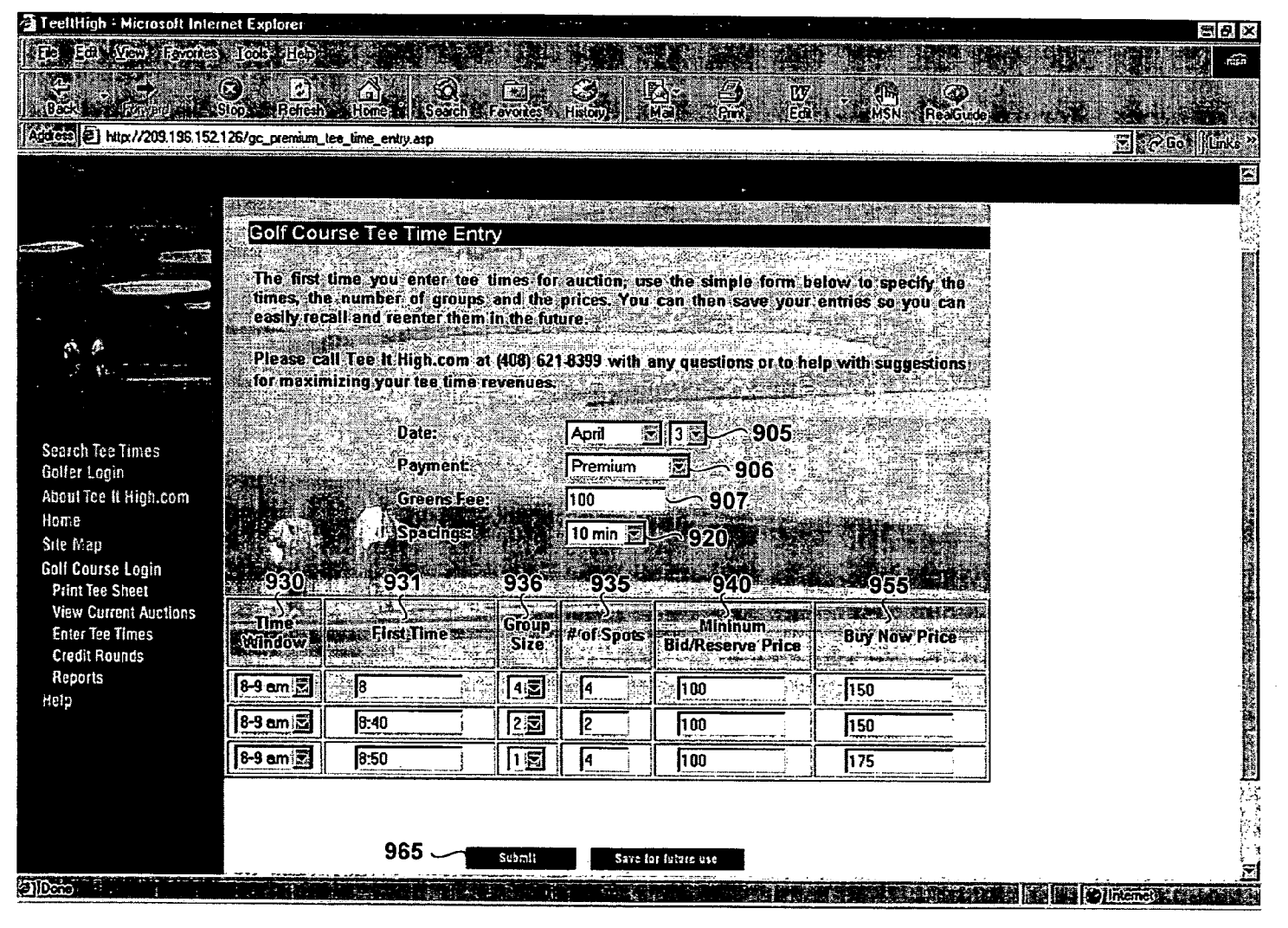

FIG. 9 illustrates a seller inventory input page 900 for sellers to provide information on inventory items 178 for auction, which, in the preferred embodiment, is for golf tee times. Again, the input mechanism is preferably available online through a conventional browser to maximize convenience to sellers. As above, like numerals are used to denote like parameters where appropriate. Thus, a seller inputs new inventory for an auction by first inputting a date for the tee time in field 905. The seller then specifies in field 906 whether an auction administrator should collect the entire bid amount or only the premium above the standard greens fee at the end of the auction. The seller also specifies a normal greens fee for this date in field 907 (which can be useful for various comparative analyses not relevant to the present invention) and a time interval between tee times in field 908, which is used to notify winning bidders of the exact winning time at the close of the auction period—in other words, an item might be identified as an 8:00 tee time, but the actual exact time might be offset by some spacing period to accommodate multiple persons within the time slot.

To input information for the auction items (tee times), the seller first specifies a time window in field 930 for the tee times, and the first tee time available within that time window in field 931 for each line item listed. The seller also provides a group size in field 936, which specifies the number of available spots of that group size within the specified time window in field 935. The seller also specifies a minimum acceptable bid amount/reserve price 945 and a Buy Now price in field 955, which represents a price at which the buyer can be guaranteed to purchase a tee time immediately, without having to wait for the end of the auction. Finally, the seller enters the inventory for sale by pressing Submit button 965.

It should be noted that user interaction screens of FIGS. 6, 7, 8 and 9 are web pages with interfaces specifically adapted for a golf tee time auction, and are but one expression of a preferred embodiment of the invention. It will be understood that the invention will be tailored and expressed through routine skill in different ways to accommodate different auction environments, and therefore it is not limited to any particular implementation. For example, while an Internet version of the auction input/review screens is described that operates within a browser, these aspects of the invention could also be implemented in hand-held devices or terminals. Furthermore, it is not necessary that the users be remote from each other, and, in fact, they can be at a single centralized location as in the case of a live car auction, for example, where many participants may be at a single location bidding on an item put up for display. Thus, the particulars of the I/O interactions are not material except to the extent that they are sufficient to allow users to engage in the auctioning processes described herein. Furthermore, those skilled in the art will appreciate that the underlying software code associated with such screens for handling and interacting with databases 160, 165, 170, auction items 178, processing user queries and bid submissions, retrieving and presenting search results, etc. can be implemented in any conventional fashion, and thus is not discussed at length here since it is not material to an understanding of the present invention.

FIG. 10 is a simplified flow chart of the bidding process as seen from a user's viewpoint from interacting with screens 600, 700 and 800 above. The user can search the available inventory with user item search input screen 600 (FIG. 6) by specifying their particular criteria at step 1010 (for example, available times at a particular course). At step 1020 CAC 100 will search the appropriate databases 155 and present a list of potential items for the user using search results page 700 (FIG. 7). If there is no item acceptable to the user at step 1030, the user is allowed to specify a new search at 1035, or to end the query at step 1037. If the search is continued, new search parameters are entered at step 1040, and the process is repeated.

In the case where at least one item is found that matches the user's criteria, the search results are tagged at step 1050. For each of the items presented to the user using bid entry page 800, he/she can enter bids at 1060, and rank them at step 1070. Thus, the unconditional bids and conditional bids are submitted at the same time for any group of items. At 1080, the user can submit the bids, and, if desired, monitor the auction process at step 1090 using search results page 700. At step 1095, the user may receive auction results, either in the form of e-mail messages requesting an increase in a bid, or in the form of a notification of the final auction results. Thereafter the user can take appropriate action such as by increasing an amount of the bid, or by simply letting a next highest bid roll be considered instead by default.

Thus the reader will see that the above system provides a highly advantageous system to simultaneously auction mutually exclusive items. This system allows the user to enter multiple, rank ordered bids that are sequentially processed. This allows the user to effectively bid on a large number of items without the concern that they will receive more than one item. The system has the additional advantages of increasing the average expected winning bid for each item, increasing the probability of sale for each of the items and decreasing the incentive for a user to enter incrementally higher bids at the last moment of the auction (sniping).

It will also be appreciated by those skilled in the art that the above discussion is directed to a preferred embodiment of the present invention, and that the present teachings can be used in a variety of different forms, in a number of different environments, applications, etc. and with various supplementary features. For example, to enhance the experience of successful participants, at least in a golf environment application, it is beneficial to evaluate user provided skill levels to combine and stagger play accordingly. Thus, an ultimate decision for identifying a specific winning tee time for an 8:00 tee slot an auction participant (i.e., whether it is actually 8:10, 8:20, 8:30, etc.) could be based on playability factors particular to the participants, the course, available play spacings, etc. Accordingly, it is intended that all such alterations and modifications be included within the scope and spirit of the invention as defined by the following claims.

What is claimed is:

1. A method of permitting users to participate in an electronic auction, the method being implemented using a computing system and comprising the steps of:
   (a) presenting items to users with the computing system from a set of N items from a database of items available for auction, said set of N items being characterized by a common auction expiration period;
   (b) receiving a set of N bids for said set of N items from said users using the computing system, such that said set of N bids includes at least one unconditional bid for one item in said set of N items, and the remainder of said set of N bids being comprised of conditional bids for a remainder of said N items;
   (c) processing said set of bids with the computing system prior to said common auction expiration period to determine if there is at least one winning bid in said set of bids, said processing being performed such that said conditional bids are not considered unless said unconditional bid for said one item is unsuccessful, and such that at most only a single item from said set of N items is matched to a single one of said set of N bids when determining said at least one winning bid.

2. The method of claim 1, further wherein during step (b) said N bids are ranked in accordance with a desired auction resolution order.

3. The method of claim 1, where said processing step (c) determines how said corresponding set of items should be auctioned based on first considering a highest ranking bid submitted.

4. The method of claim 1, wherein during step (b), said set of bids includes at least one unconditional bid for a highest ranked item taken from said corresponding set of items, and the remainder of said set of bids being comprised of conditional bids for items ranked below said highest ranked item.

5. A method of permitting users to participate in an electronic auction, the method being implemented using a computing system and comprising the steps of:
   (a) receiving a first bid from a first user with the computing system for a first auction item that is to be auctioned during a first auction expiration period; and
   (b) receiving a second bid from said first user with the computing system, prior to expiration of said first auction expiration period, for a second auction item that is to be to be auctioned during a second auction expiration period;
   (c) processing said first bid with the computing system prior to an end of said first auction expiration period to determine if it is a winning bid for said first auction item; and
      1) discarding said second bid for said first user when said first bid is a winning bid; and
      2) when said first bid is not a winning bid, said second bid is processed prior to said second auction expiration period to determine if it is a winning bid for second auction item;
      wherein a first user can submit both a first bid for a first item and a second bid for said second auction item and still only win at most one of such items.

6. The method of claim 5, wherein said first bid is treated an unconditional bid, and said second bid is treated as a conditional bid until said first bid is determined to be unsuccessful.

7. The method of claim 5, wherein at most only one of said first bid and second bid are declared as a winning bid during an overlap between said first auction expiration period and said second auction expiration period.

8. A method of allowing a purchaser to bid on a right of access to one or more facilities, each of which facilities has a finite capacity for accommodating purchasers at a particular time, said method being implemented using a computing system and comprising the steps of:
   (a) presenting access items related to the one or more facilities with the computing system, said access items each corresponding to an access time available at the one or more facilities;
   (b) selecting a set of access items from said access items with the computing system, said set of access items being based on a selected access time and selected facility chosen by the purchaser;
   (c) receiving a set of bids for said set of access items, such that each bid from said set of bids includes both a bid price and a bid ranking for an access item;
      wherein said bid ranking for said access item designates an order for resolving a bid relative to other bids provided by a purchaser for other access items, and such that the purchaser can control through said bid ranking in what order said set of bids are considered to determine whether they are winning bids for any of said access items.

9. The method of claim 8, wherein said set of bids further includes personal information concerning the purchaser, and said personal information is compared against that of other purchasers to determine a final access time awarded to the purchaser for said access items.

10. The method of claim 8, wherein said access items are auctioned across different auction expiration periods.

11. The method of claim 8, wherein after any bid from the purchaser is determined to be a winning bid, any remaining bids from the purchaser are disregarded.

12. A method of conducting an electronic auction for access rights to a facility, the method being implemented using a computing system and comprising the steps of:
- (a) dividing a capacity of the facility into a set of access time windows with the computing system;
- (b) creating a set of access right items based on said set of access time windows with the computing system, said access right items including at least an access starting time and access duration associated with a user performing an activity at the facility;
- (c) receiving bids for said access right items with the computing system, each of said bids including a bid price and a bid ranking;
    - wherein said bid ranking for said access right item designates an order for resolving a bid relative to other bids provided by said user for other access right items;
- (d) processing said bids with the computing system based on both said bid price and bid ranking to determine whether any successful bids exist for any of said access right items;
    - wherein all of said access right items are auctioned at the same time with the computing system.

13. The method of claim 12 wherein said access right items further include a capacity value specifying a number of persons that can perform said activity at the facility during said access time window.

14. The method of claim 12 wherein said access right items further include an access time spacing, such that a plurality of access right items can be associated with an access time window, and said plurality of access right items are separated in time by said access time spacing.

15. The method of claim 12 further including a step of defining a minimum bid price for said set of access right items.

16. The method of claim 12 further including a step of defining a guaranteed bid price for said set of access right items, which guaranteed bid price specifies a bid price that will result in a an automatic successful bid.

17. A system for participating in an electronic auction comprising:
- (a) a set of N items stored in a database of items available for auction, said set of N items being characterized by a common auction expiration period;
- (b) a bid input interface for entering a set of N bids for said set of N items, said bid input interface constraining said set of N bids such that at least one unconditional bid is provided by a user for one item in said set of N items, and the remainder of said set of N bids from said user are comprised of conditional bids for a remainder of said N items;
- (c) an auction processor coupled to said database of items and said bid input interface, and being further adapted to process said set of bids prior to said common auction expiration period to determine if there is at least one winning bid in said set of bids, said processing being performed such that said conditional bids are not considered unless said unconditional bid for said one item is unsuccessful, and such that at most only a single item from said set of N items is matched to a single one of said set of N bids for said user when determining said at least one winning bid.

18. A system for participating in an electronic auction comprising:
- (a) a database of auction items, said auction items including first auction items available for bidding during a first auction period, and second auction items available for bidding during a second bidding period;
- (b) a bid input device for transmitting a first bid for one of said first auction items and a second bid for one of said second auction items, said first and second bids being received from a single bidder prior to an expiration of said first auction period;
- (c) an auction processor coupled to said database of auction items and said bid input device, and being further adapted to determine if said first bid is a winning bid prior to said expiration of said first auction period; and being further configured to process said second bid when said first bid is finally determined to be not a winning bid;
    - wherein said single bidder can submit both a first bid for a first item and a second bid for a second item and still only win at most one of such items.

19. The system of claim 18, wherein said item is an access right to a venue having a finite capacity.

20. The system of claim 18 wherein said item is an intangible property.

21. A system for allowing a purchaser to bid on a right to play golf at a selected time and at a selected golf facility in an electronic auction, said system comprising:
- (d) a query interface for presenting a list of available golf playing opportunities to the purchaser, said golf playing opportunities including information identifying both a golf course and a time at said golf course available for playing golf;
- (e) a bid interface adapted to allow the purchaser to enter a bid for each of said one or more golf playing opportunities, said bid including both a bid price and a bid ranking for each of said one or more golf playing opportunities, so that a set of purchaser bids are created for said one or more golf playing opportunities;
- (f) an auction processor for processing said set of purchaser bids, along with third party bids for said one or more golf playing opportunities, to determine winning bids for said golf playing opportunities;
- (g) an e-mail notification system for notifying the purchaser when a currently highest ranked bid from said purchaser is determined to be a winning bid or when said currently highest ranked bid is determined to be not a winning bid; said auction processor being further configured:
    1) to allow the purchaser to increase said bid price for said highest ranked bid within a predetermined time period when said highest ranked bid is determined to be not a winning bid;
    2) to evaluate new bids until the end of the common expiration period, and until all of said purchaser bids are determined to be not winning bids, or until one of said purchaser bids is determined to be a winning bid;
    - wherein the purchaser is permitted to bid on multiple golf playing opportunities using said set of purchaser bids, but at most only a single one of said set of purchaser bids is satisfied as a winning bid.

* * * * *